US011908404B2

(12) United States Patent
Huangfu et al.

(10) Patent No.: US 11,908,404 B2
(45) Date of Patent: Feb. 20, 2024

(54) DISPLAY PANEL, PIXEL CIRCUIT AND METHOD FOR DRIVING THE PIXEL CIRCUIT

(71) Applicant: BOE TECHNOLOGY GROUP CO., LTD., Beijing (CN)

(72) Inventors: Lujiang Huangfu, Beijing (CN); Libin Liu, Beijing (CN); Can Zheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 149 days.

(21) Appl. No.: 17/599,387

(22) PCT Filed: Jan. 14, 2021

(86) PCT No.: PCT/CN2021/071674
§ 371 (c)(1),
(2) Date: Sep. 28, 2021

(87) PCT Pub. No.: WO2021/143752
PCT Pub. Date: Jul. 22, 2021

(65) Prior Publication Data

US 2022/0199022 A1 Jun. 23, 2022

(30) Foreign Application Priority Data

Jan. 16, 2020 (CN) ......................... 202010046970.0

(51) Int. Cl.
*G09G 3/3233* (2016.01)

(52) U.S. Cl.
CPC ... *G09G 3/3233* (2013.01); *G09G 2300/0842* (2013.01); *G09G 2310/061* (2013.01); *G09G 2310/08* (2013.01); *G09G 2330/02* (2013.01)

(58) Field of Classification Search
None
See application file for complete search history.

(56) References Cited

U.S. PATENT DOCUMENTS 6,229,506 B1 5/2001 Dawson et al.
7,057,588 B2 6/2006 Asano et al.
(Continued)

FOREIGN PATENT DOCUMENTS

CN 104157240 A 11/2014
CN 104992674 A 10/2015
(Continued)

OTHER PUBLICATIONS

Lujiang Huangfu, et al., "LTPS-TFT threshold voltage compensation pixel circuit for AMOLED" issued on Aug. 2017, Chinese Journal of Liquid Crystals and Displays, vol. 32 No. 8.
(Continued)

*Primary Examiner* — Ifedayo B Iluyomade
(74) *Attorney, Agent, or Firm* — HOUTTEMAN LAW LLC

(57) ABSTRACT

The present disclosure provides a display panel, a pixel circuit and a method for driving the pixel circuit, the pixel circuit includes: a storage capacitor circuit; a light-emitting element; a driving transistor; a reset circuit, the reset circuit is configured to receive a reset control signal and reset a first node and a second node according to the reset control signal, or receive a writing control signal and/or a timing sequence control signal of an adjacent pixel row and reset the first node and the second node according to the writing control signal and/or the timing sequence control signal of the adjacent pixel row; a threshold compensation circuit, configured to receive a compensation control signal and write a compensation voltage into the first node according to the compensation control signal; a writing circuit; and a light-emitting control circuit.

20 Claims, 10 Drawing Sheets

(56) References Cited

U.S. PATENT DOCUMENTS

| | | | |
|---|---|---|---|
| 8,917,225 B2 | 12/2014 | Kang et al. | |
| 8,941,567 B2 | 1/2015 | Park et al. | |
| 2004/0070557 A1 | 4/2004 | Asano et al. | |
| 2011/0193856 A1 | 8/2011 | Han | |
| 2013/0057532 A1 | 3/2013 | Lee et al. | |
| 2014/0168180 A1 | 6/2014 | Wallman | |
| 2015/0348464 A1 | 12/2015 | In et al. | |
| 2018/0315374 A1* | 11/2018 | Zhang .................. | G09G 3/3208 |

FOREIGN PATENT DOCUMENTS

| | | | |
|---|---|---|---|
| CN | 105185305 | A | 12/2015 |
| CN | 105206220 | A | 12/2015 |
| CN | 105989791 | A | 10/2016 |
| CN | 106097964 | A | 11/2016 |
| CN | 107342048 | A | 11/2017 |
| CN | 107680533 | A | 2/2018 |
| CN | 108510936 | A | 9/2018 |
| CN | 110189708 | A | 8/2019 |
| CN | 110428780 | A | 11/2019 |
| CN | 110491335 | A | 11/2019 |
| CN | 110648630 | A | 1/2020 |
| CN | 110675815 | A | 1/2020 |
| CN | 111243479 | A | 6/2020 |
| IN | 105206221 | B | 6/2018 |
| KR | 20130030879 | A | 3/2013 |

OTHER PUBLICATIONS

China Patent Office, CN202010046970.0 First Office Action dated Mar. 29, 2023.

* cited by examiner

DISPLAY PANEL, PIXEL CIRCUIT AND METHOD FOR DRIVING THE PIXEL CIRCUIT

CROSS REFERENCE TO RELATED DISCLOSURE

The present disclosure claims priority to Chinese patent publication No. 202010046970.0, filed on Jan. 16, 2020, the disclosure of which is incorporated herein by reference.

TECHNICAL FIELD

The present disclosure relates to the field of display technology, and in particular, to a pixel circuit, a display panel, and a method for driving the pixel circuit.

BACKGROUND

In the related art, the detection of threshold voltages is performed in synchronization with a refresh process of a data voltage. However, there is a problem in the related art that circuits are not reset or are reset insufficiently, and thus an initial charging state determined by display contents of a previous frame affects an accuracy of the detection of the threshold voltages, and therefore, consistent reset of initial states of the circuits is very necessary for high-quality compensation for the threshold voltages.

SUMMARY

An embodiment of a first aspect of the present disclosure provides a pixel circuit, including: a storage capacitor circuit, a first terminal of the storage capacitor circuit being electrically coupled to a first node, a second terminal of the storage capacitor circuit being electrically coupled to a second node; a light-emitting element; a driving transistor having a control electrode electrically coupled to the first node; a writing circuit electrically coupled to the storage capacitor circuit and configured to receive a writing control signal and write a data voltage into the storage capacitor circuit according to the writing control signal; a reset circuit electrically coupled to the first node and the second node, the reset circuit being configured to receive a reset control signal and reset the first node and the second node according to the reset control signal, or being configured to receive the writing control signal and/or a timing control signal of an adjacent pixel row and reset the first node and the second node according to the writing control signal and/or the timing control signal of the adjacent pixel row; a threshold compensation circuit electrically coupled to the first node and the driving transistor, the threshold compensation circuit being configured to receive a compensation control signal and write a compensation voltage into the first node according to the compensation control signal, where the compensation voltage includes at least a threshold voltage of the driving transistor; and a light-emitting control circuit electrically coupled to the driving transistor and the light-emitting element and being configured to receive a light-emitting control signal and control the light-emitting element to emit light according to the light-emitting control signal, where the driving transistor controls the light-emitting element to emit light according to a voltage of the first node, and the voltage of the first node in a driving stage is a voltage generated by adding the data voltage and the compensation voltage.

According to an implementation, the reset circuit is configured to receive the reset control signal supplied through a reset control line or the writing control signal supplied through a writing control line, and the reset circuit includes: a first transistor having a first electrode electrically coupled to the first node, a second electrode electrically coupled to a first power supply line, and a control electrode electrically coupled to the reset control line or the writing control line, where the first power supply line is configured to supply a first voltage to the reset circuit; a second transistor having a first electrode electrically coupled to the second node, a second electrode electrically coupled to a second power supply line, and a control electrode electrically coupled to the reset control line or the writing control line, where the second power supply line is configured to supply a second voltage to the reset circuit.

According to an implementation, the reset circuit further includes a potential holding circuit electrically coupled to the second node, the reset circuit is configured to receive the compensation control signal and write the second voltage to the second node according to the compensation control signal, where the compensation control signal is supplied to the potential holding circuit through a compensation control line, and the potential holding circuit includes: a third transistor having a first electrode electrically coupled to the second node, a second electrode electrically coupled to the second power supply line, and a control electrode electrically coupled to the compensation control line.

According to an implementation, the reset circuit is configured to reset the first node and the second node according to the timing control signal of the adjacent pixel row, the timing control signal of the adjacent pixel row includes a compensation control signal of a previous pixel row and a light-emitting control signal of a next pixel row, the reset circuit including: a fourth transistor having a first electrode electrically coupled to the first node, and a control electrode electrically coupled to a light-emitting control line of the next pixel row; a fifth transistor having a first electrode electrically coupled to a second electrode of the fourth transistor, a second electrode electrically coupled to a first power supply line, a control electrode electrically coupled to a compensation control line of the previous pixel row, where the first power supply line is configured to supply a first voltage to the reset circuit; a sixth transistor having a first electrode electrically coupled to the second node, a second electrode electrically coupled to a second power supply line, and a control electrode electrically coupled to the compensation control line of the previous pixel row, where the second power supply line is configured to supply a second voltage to the reset circuit.

According to an implementation, the writing circuit is configured to receive a data voltage supplied through a data line, and the reset circuit is configured to reset the first node and the second node according to the reset control signal or the timing control signal of the adjacent pixel row, where the writing circuit includes a seventh transistor having a first electrode electrically coupled to the data line, a second electrode electrically coupled to the second node, and a control electrode electrically coupled to the writing control line; the storage capacitor circuit includes a first capacitor and a second capacitor, where a terminal of the first capacitor is electrically coupled to the first node, and another terminal of the first capacitor is electrically coupled to the second node; a terminal of the second capacitor is electrically coupled to the first node or the second node, and another terminal of the second capacitor is electrically coupled to a third power supply line, where the third power supply line is configured to provide a third voltage to the storage capacitor circuit.

According to an implementation, the reset circuit is configured to reset the first node and the second node according to the writing control signal and the timing control signal of the adjacent pixel row, the timing control signal of the adjacent pixel row including a compensation control signal of a previous pixel row, the reset circuit including: an eighth transistor having a first electrode electrically coupled to the first node, a second electrode electrically coupled to a first power supply line, and a control electrode electrically coupled to the writing control line, where the first power supply line is configured to supply a first voltage to the reset circuit; a ninth transistor having a first electrode electrically coupled to the second node, a second electrode electrically coupled to a second power supply line, and a control electrode electrically coupled to the compensation control line of the previous pixel row, where the second power supply line is configured to supply a second voltage to the reset circuit.

According to an implementation, the writing circuit is configured to receive a data voltage supplied through a data line, and the reset circuit is configured to write the first voltage and the second voltage to the first node and the second node, respectively, according to the writing control signal, or write the first voltage and the second voltage to the first node and the second node, respectively, according to the writing control signal and the timing control signal of the adjacent pixel row, the writing circuit includes a tenth transistor having a first electrode electrically coupled to the data line, and a control electrode electrically coupled to the writing control line; the storage capacitor circuit includes a third capacitor and a temporary storage circuit, where a terminal of the third capacitor is electrically coupled to the first node, another terminal of the third capacitor is electrically coupled to the second node, a first terminal of the temporary storage circuit is electrically coupled to the second node, a second terminal of the temporary storage circuit is electrically coupled to a second electrode of the tenth transistor, and a control terminal of the temporary storage circuit is electrically coupled to a light-emitting control line for providing the light-emitting control signal.

According to an implementation, the temporary storage circuit includes a fourth capacitor and an eleventh transistor, where a first electrode of the eleventh transistor is electrically coupled to the second node, a second electrode of the eleventh transistor is electrically coupled to the second electrode of the tenth transistor, and a control electrode of the eleventh transistor is electrically coupled to the light-emitting control line; a terminal of the fourth capacitor is electrically coupled to the second electrode of the tenth transistor, and another terminal of the fourth capacitor is electrically coupled to a third power supply line, where the third power supply line is configured to provide a third voltage to the temporary storage circuit.

According to an implementation, the temporary storage circuit includes a fifth capacitor and a twelfth transistor, where a terminal of the fifth capacitor is electrically coupled to the second node, and another terminal of the fifth capacitor is electrically coupled to the second electrode of the tenth transistor; a first electrode of the twelfth transistor is electrically coupled to the another terminal of the fifth capacitor, a second electrode of the twelfth transistor is electrically coupled to a third power supply line, and a control electrode of the twelfth transistor is electrically coupled to the light-emitting control line, where the third power supply line is configured to provide a third voltage to the temporary storage circuit.

According to an implementation, the reset circuit is configured to receive the writing control signal provided through a writing control line, and the reset circuit is configured to write the first voltage and the second voltage to the first node and the second node, respectively, according to the writing control signal, the writing circuit is configured to receive the data voltage supplied through a data line, where, the writing circuit includes a thirteenth transistor having a first electrode electrically coupled to the data line, a second electrode electrically coupled to the second node, and a control electrode electrically coupled to the writing control line; the reset circuit shares the thirteenth transistor with the writing circuit, the reset circuit further includes a fourteenth transistor, a first electrode of the fourteenth transistor is electrically coupled to the first node, a second electrode of the fourteenth transistor is electrically coupled to a first power supply line, a control electrode of the fourteenth transistor is electrically coupled to the writing control line, where the first power supply line is configured to supply the first voltage to the reset circuit; the storage capacitor circuit includes a sixth capacitor and a temporary storage circuit, where a terminal of the sixth capacitor is electrically coupled to the first node, and another terminal of the sixth capacitor is electrically coupled to the second node; the temporary storage circuit includes a seventh capacitor, a fifteenth transistor and a sixteenth transistor, where a first electrode of the fifteenth transistor is electrically coupled to the second node, a second electrode of the fifteenth transistor is electrically coupled to a terminal of the seventh capacitor, and a control electrode of the fifteenth transistor is electrically coupled to the writing control line; a first electrode of the sixteenth transistor is electrically coupled to the second node, a second electrode of the sixteenth transistor is electrically coupled to the terminal of the seventh capacitor, and a control electrode of the sixteenth transistor is electrically coupled to a light-emitting control line which supplies the light-emitting control signal; another terminal of the seventh capacitor is electrically coupled to a third power supply line, where the third power supply line is configured to supply a third voltage to the temporary storage circuit.

According to an implementation, the reset circuit is further configured to reset an anode of the light-emitting element according to the reset control signal or the writing control signal or the timing control signal of the adjacent pixel row, where the timing control signal of the adjacent pixel row is the compensation control signal of a previous pixel row, and the reset circuit further includes: a seventeenth transistor having a first electrode electrically coupled to the anode of the light-emitting element, a second electrode electrically coupled to the first power supply line, and a control electrode electrically coupled to a reset control line or a writing control line or a compensation control line of the previous pixel row.

According to an implementation, the reset circuit is further configured to receive a compensation control signal and reset the first node and the second node according to the compensation control signal and the timing control signal of the adjacent pixel row, where the reset circuit is configured to receive the compensation control signal provided through the compensation control line, the timing control signal of the adjacent pixel row includes a light-emitting control signal of a previous pixel row and a compensation control signal of a next pixel row, and the reset circuit includes: an eighteenth transistor having a first electrode coupled to the second node, a second electrode electrically coupled to a second power supply line, and a control electrode electrically coupled to a compensation control line of a current pixel row, where the second power supply line is configured to supply a second voltage to the reset circuit; a nineteenth transistor having a first electrode electrically coupled to the light-emitting control circuit, a second electrode electrically coupled to a first power supply line, a control electrode electrically coupled to the compensation control line of the current pixel row, where the first power supply line is configured to supply a first voltage to the reset circuit; a blocking circuit electrically coupled between the threshold compensation circuit and the driving transistor or between the driving transistor and a power supply, and further coupled to the light-emitting control line of the previous pixel row and the compensation control line of the next pixel row, and is configured to be turned on or turned off according to the light-emitting control signal of the previous pixel row and the compensation control signal of the next pixel row; where, during the reset circuit resetting the first node and the second node, the second voltage is written into the second node through the eighteenth transistor, the blocking circuit is turned on under control of the light-emitting control signal of the previous pixel row and the compensation control signal of the next pixel row, the light-emitting control circuit is turned on under control of the light-emitting control signal, the threshold compensation circuit is turned on under control of the compensation control signal, and the first voltage is written into the first node through the nineteenth transistor, the light-emitting control circuit, and the threshold compensation circuit.

According to an implementation, the blocking circuit includes a twentieth transistor and a twenty-first transistor, where first electrodes of the twentieth transistor and the twenty-first transistor are each electrically coupled to a second electrode of the driving transistor and second electrodes of the twentieth transistor and the twenty-first transistor are each electrically coupled to the threshold compensation circuit, or the first electrodes of the twentieth transistor and the twenty-first transistor are each electrically coupled to a power supply and the second electrodes of the twentieth transistor and the twenty-first transistor are each electrically coupled to a first electrode of the driving transistor, and where a control electrode of the twentieth transistor is coupled to the light-emitting control line of the previous pixel row, and a control electrode of the twenty-first transistor is coupled to the compensation control line of the next pixel row.

An embodiment of a second aspect of the present disclosure provides a display panel, including the pixel circuit in the first aspect.

An embodiment of a third aspect of the present disclosure provides a method for driving the above pixel circuit, including: receiving the writing control signal, and writing the data voltage into the storage capacitor circuit according to the writing control signal; receiving the reset control signal and resetting the first node and the second node according to the reset control signal, or receiving the writing control signal and/or the timing sequence control signal of the adjacent pixel row and resetting the first node and the second node according to the writing control signal and/or the timing sequence control signal of the adjacent pixel row; receiving the compensation control signal, and writing the compensation voltage into the first node according to the compensation control signal, where the compensation voltage includes at least the threshold voltage of the driving transistor; and receiving the light-emitting control signal, and controlling the light-emitting element to emit light according to the light-emitting control signal, where the driving transistor controls the light-emitting element to emit light according to the voltage of the first node, and the voltage of the first node in the driving stage is the voltage generated by adding the data voltage and the compensation voltage.

Additional aspects and advantages of the disclosure will be set forth in part in the description which follows and, in part, will be obvious from the description, or may be learned by practice of the disclosure.

DRAWINGS

The above and/or additional aspects and advantages of the present disclosure will become apparent and readily appreciated from the following description of the embodiments, taken in conjunction with the accompanying drawings of which:

Figure 2:
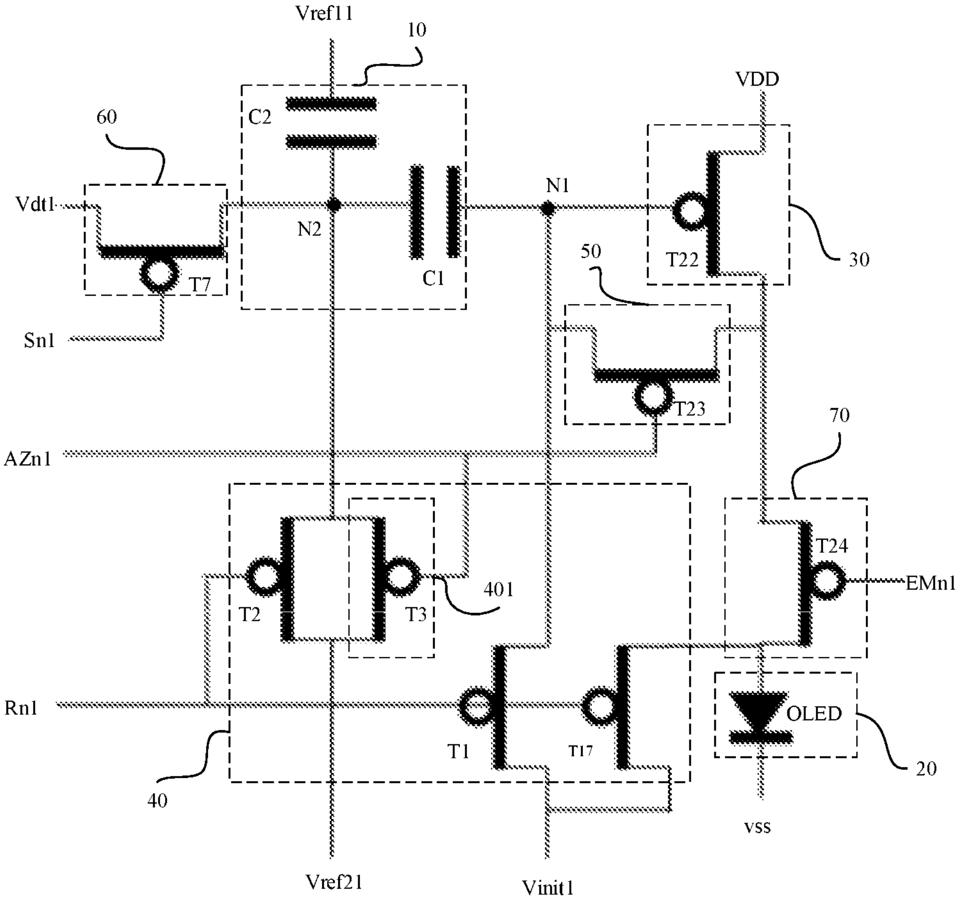
FIG. 2 is a circuit schematic diagram of a pixel circuit according to an embodiment of the present disclosure.
Figure 2A:
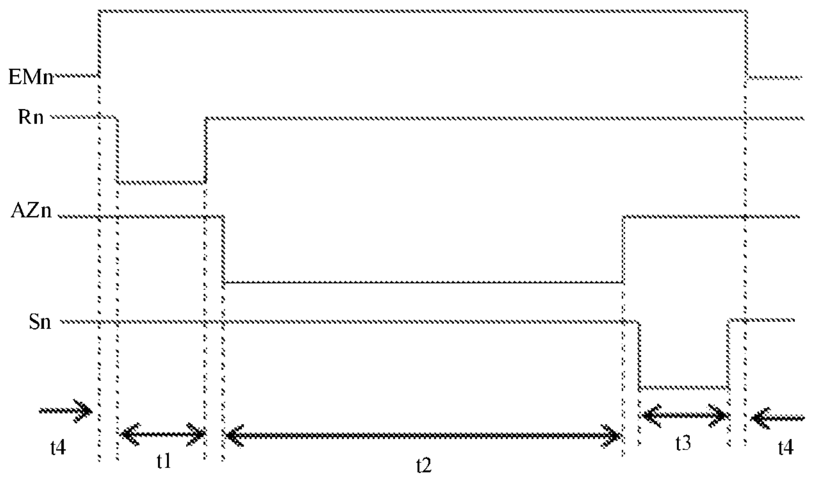
Figure 3:
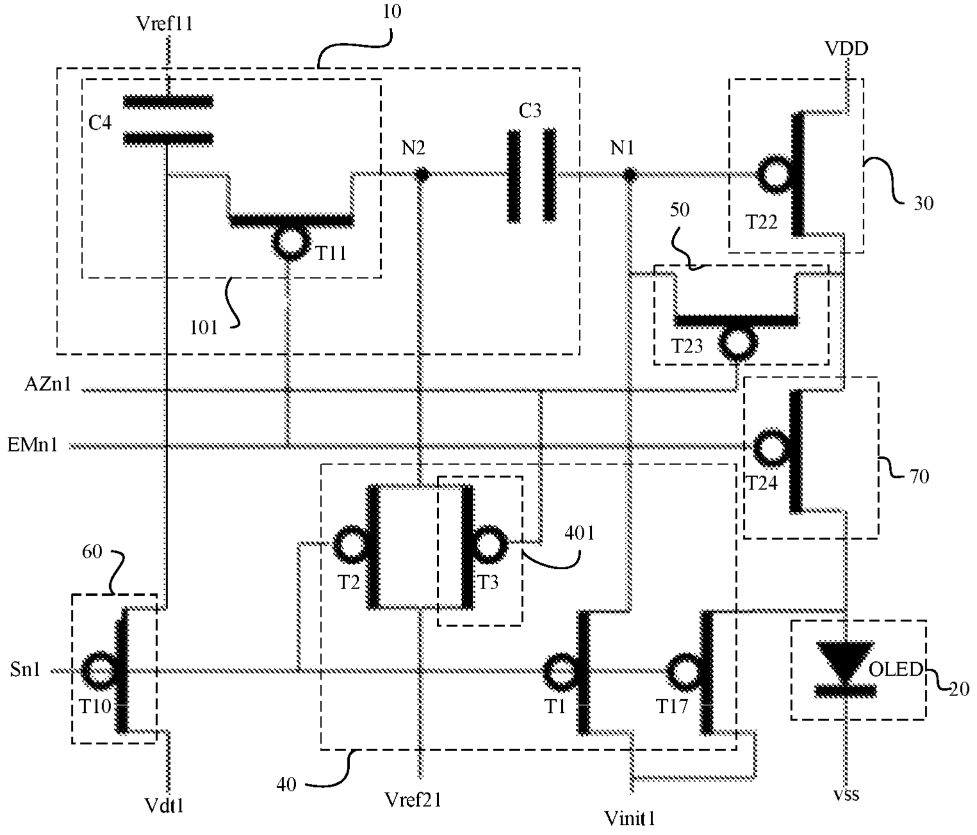
Figure 3A:
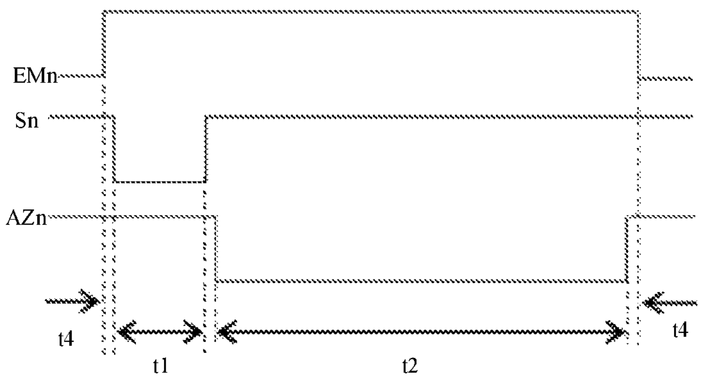
Figure 4:
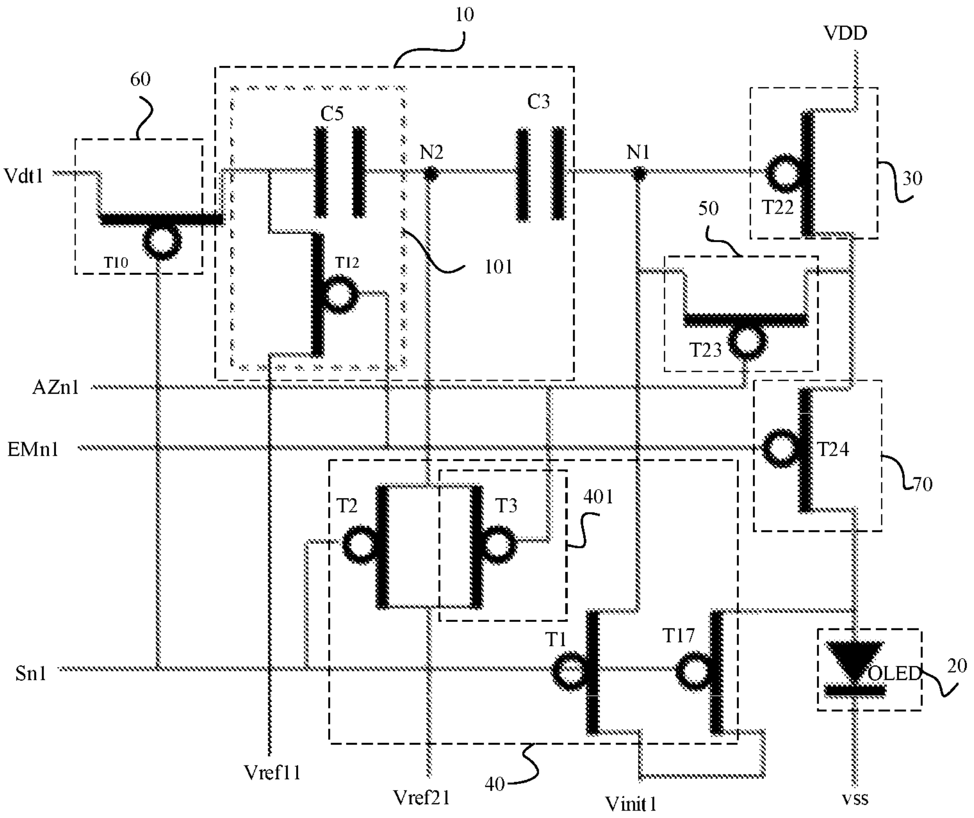
Figure 5:
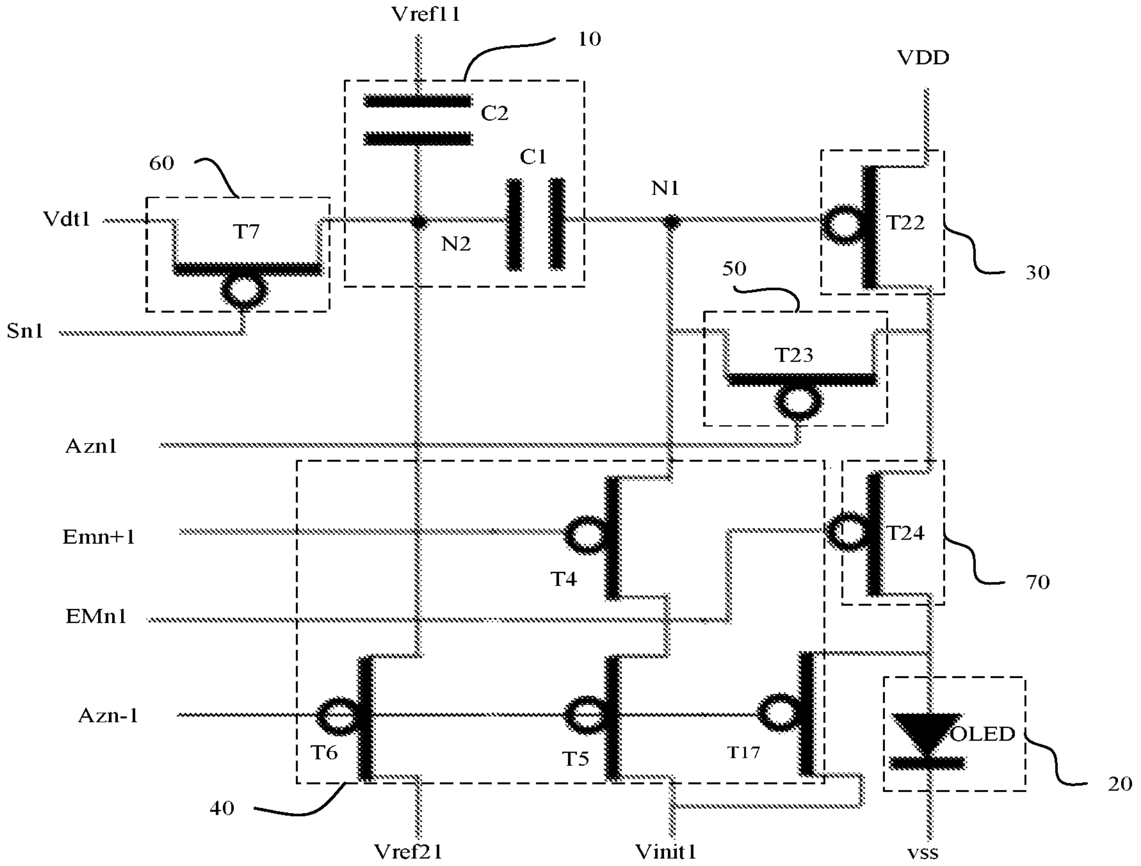
Figure 5A:
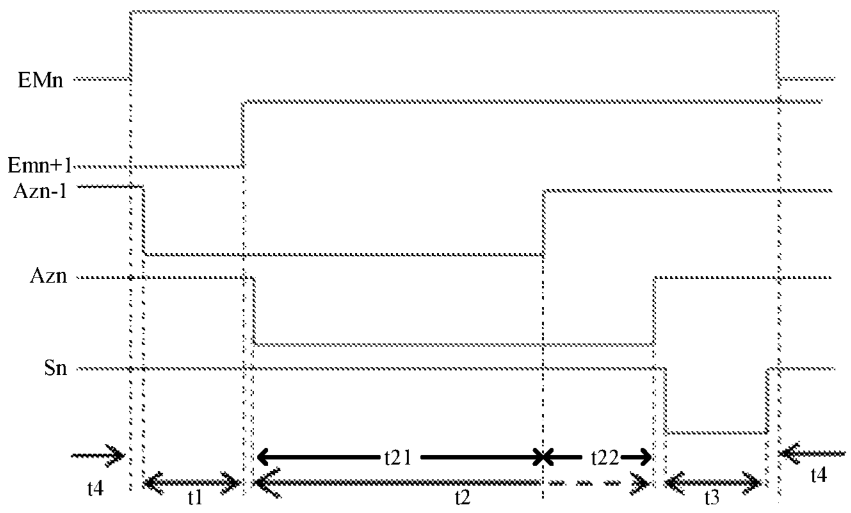
Figure 6:
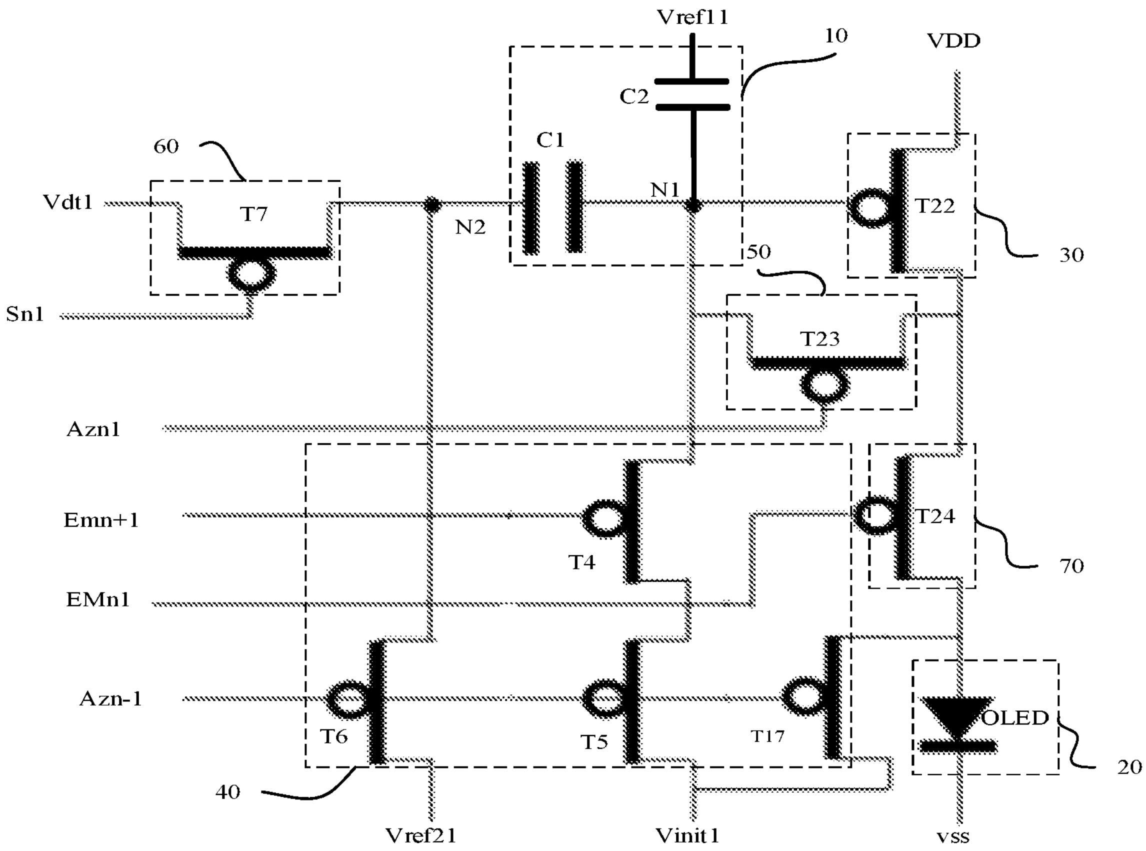
Figure 7:
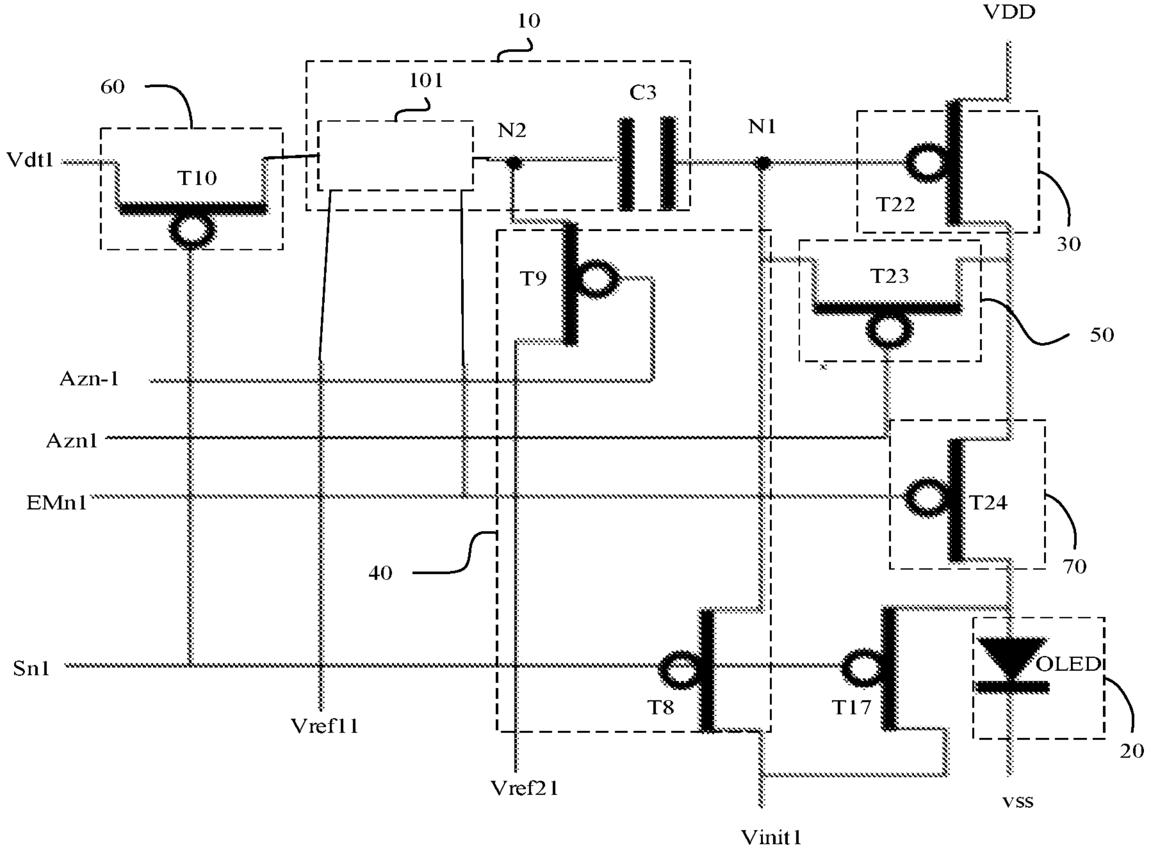
Figure 7A:
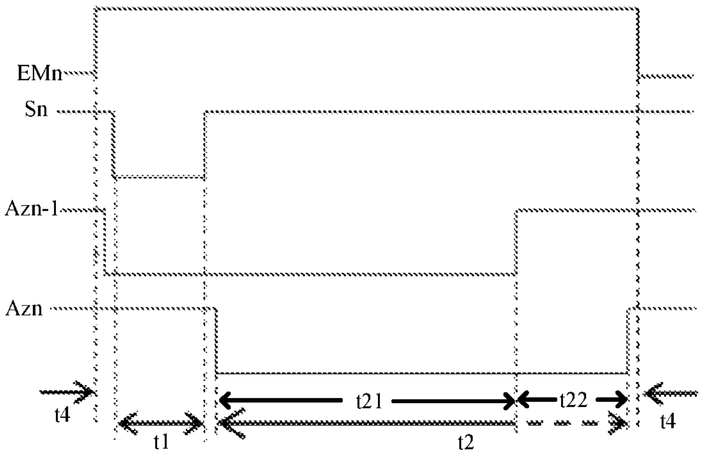
Figure 8:
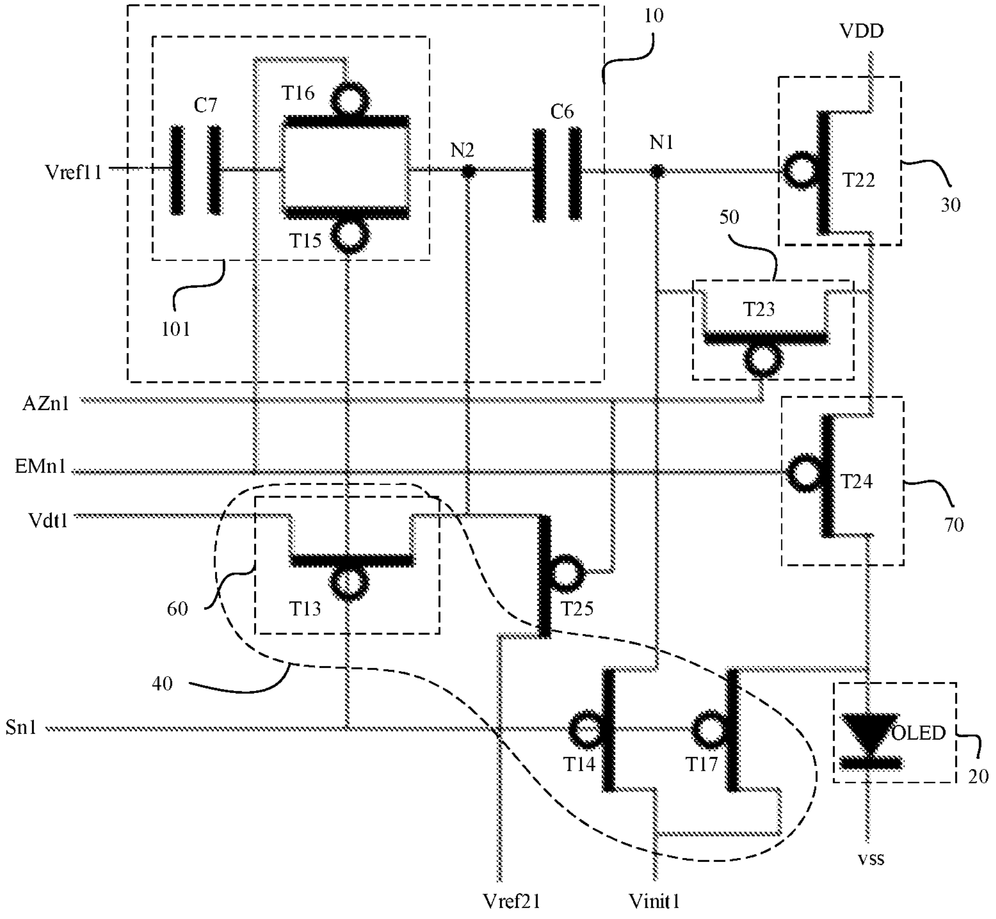
Figure 8A:
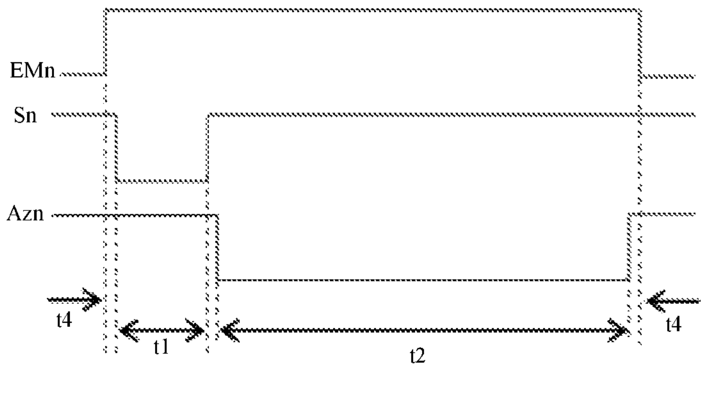
Figure 9:
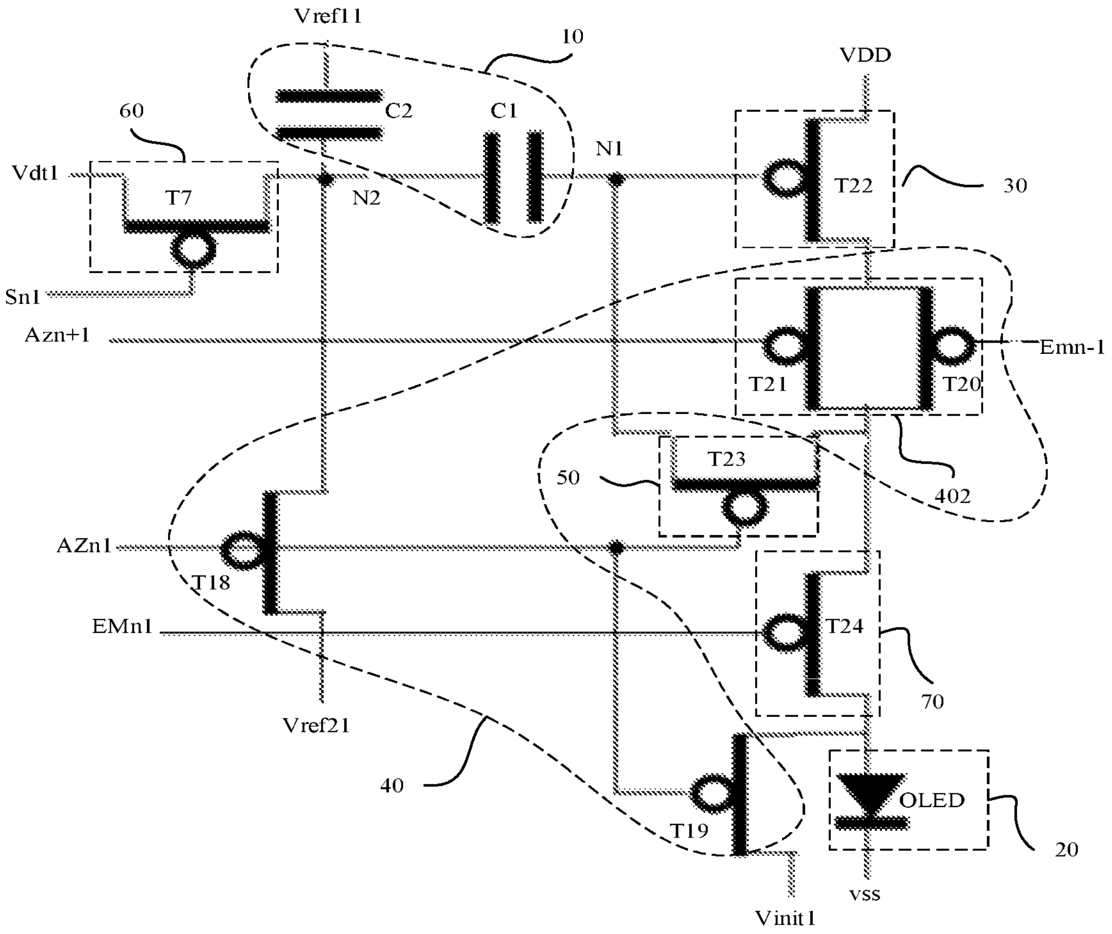
Figure 9A:
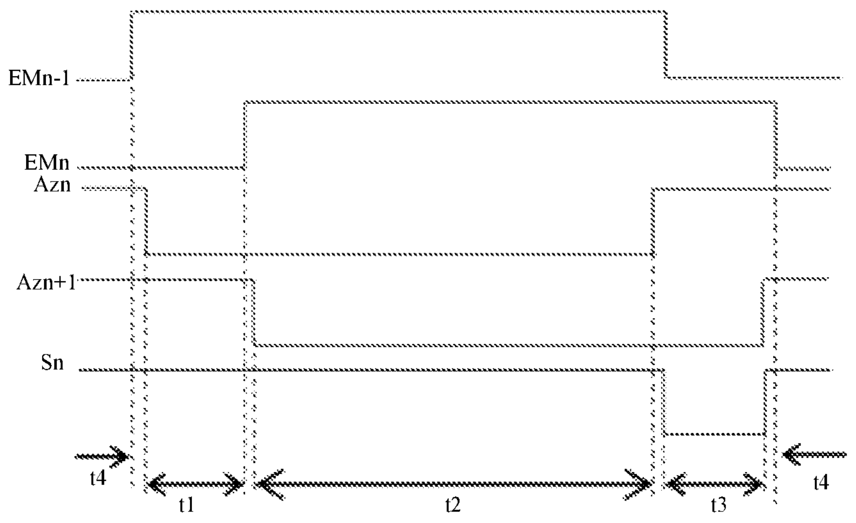
Figure 10:
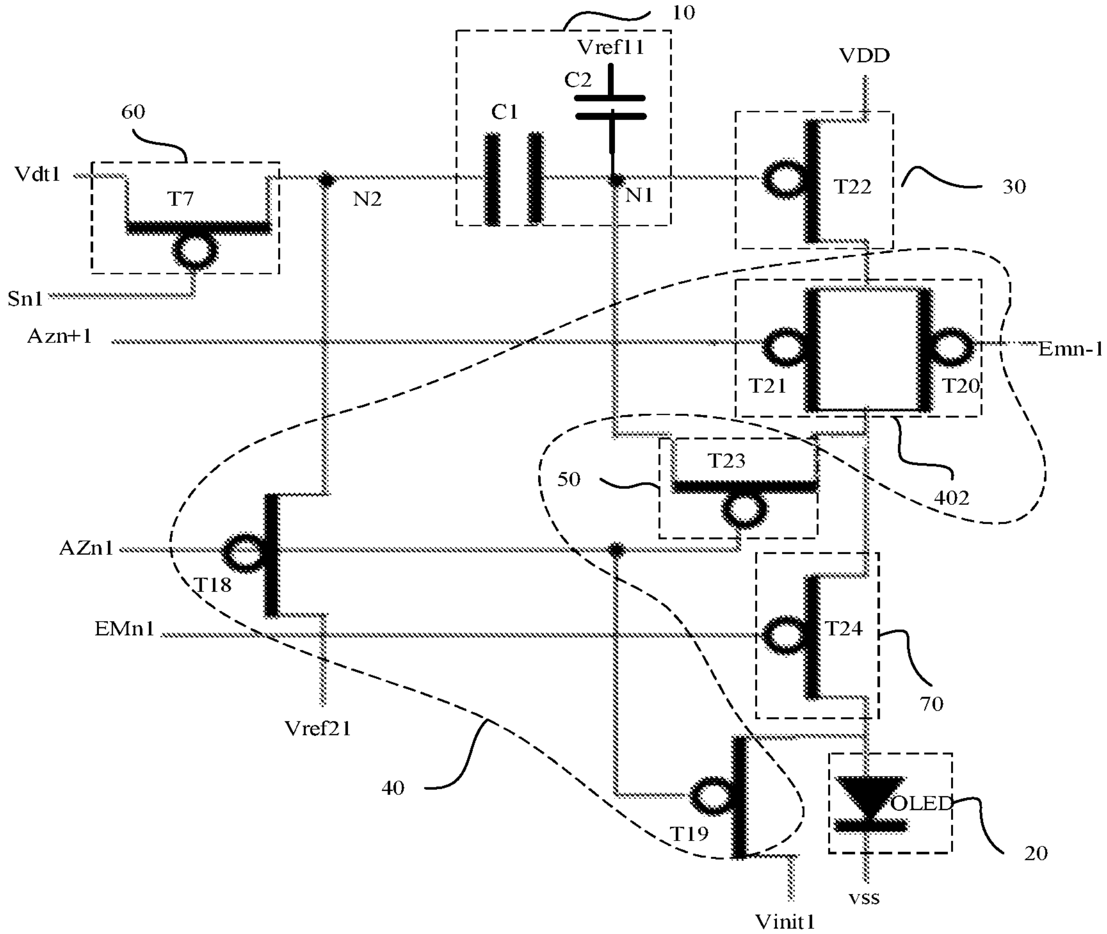
Figure 11:
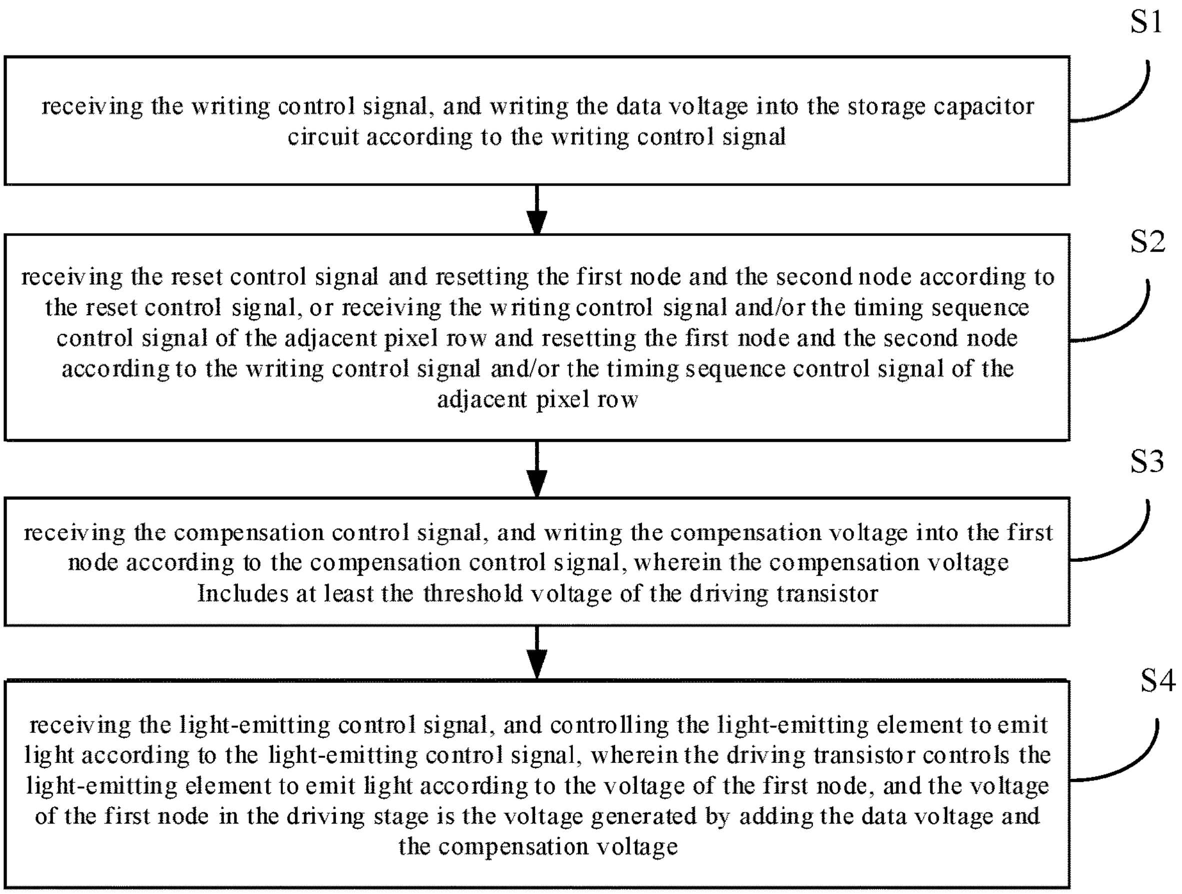

FIG. 2*a* is a timing diagram of a pixel circuit according to an embodiment of the present disclosure;

FIG. 3 is a circuit schematic diagram of a pixel circuit according to an embodiment of the present disclosure;

FIG. 3*a* is a timing diagram of a pixel circuit according to an embodiment of the present disclosure;

FIG. 4 is a circuit schematic diagram of a pixel circuit according to an embodiment of the present disclosure;

FIG. 5 is a circuit schematic diagram of a pixel circuit according to an embodiment of the present disclosure;

FIG. 5*a* is a timing diagram of a pixel circuit according to an embodiment of the present disclosure;

FIG. 6 is a circuit schematic diagram of a pixel circuit according to an embodiment of the present disclosure;

FIG. 7 is a circuit schematic diagram of a pixel circuit according to an embodiment of the present disclosure;

FIG. 7*a* is a timing diagram of a pixel circuit according to an embodiment of the present disclosure;

FIG. 8 is a circuit schematic diagram of a pixel circuit according to an embodiment of the present disclosure;

FIG. 8*a* is a timing diagram of a pixel circuit according to an embodiment of the present disclosure;

FIG. 9 is a circuit schematic diagram of a pixel circuit according to an embodiment of the present disclosure;

FIG. 9*a* is a timing diagram of a pixel circuit according to an embodiment of the present disclosure;

FIG. 10 is a circuit schematic of a pixel circuit according to an embodiment of the present disclosure; and FIG. 11 is a flowchart illustrating a method for driving a pixel circuit according to an embodiment of the present disclosure.

DETAILED DESCRIPTION

Reference will now be made in detail to the embodiments of the present disclosure, examples of which are illustrated in the accompanying drawings, where like reference numerals refer to the same or similar elements or elements having the same or similar functions throughout. The embodiments described below with reference to the accompanying drawings are illustrative and intended to explain the present disclosure, and should not be construed as limiting the present disclosure.

A display panel, a pixel circuit, and a method for driving the pixel circuit according to embodiments of the present disclosure are described below with reference to the accompanying drawings.

Figure 1:
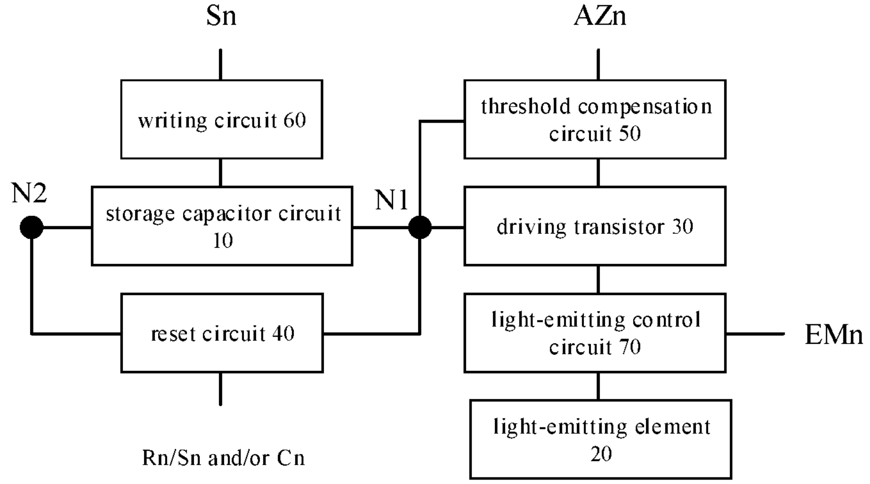
FIG. 1 is a block schematic diagram of a pixel circuit according to an embodiment of the present disclosure.

FIG. 1 is a block schematic diagram of a pixel circuit according to an embodiment of the present disclosure. As shown in FIG. 1, the pixel circuit in the embodiment of the present disclosure includes: a storage capacitor circuit 10, a light-emitting element 20, a driving transistor 30, a writing circuit 60, a reset circuit 40, a threshold compensation circuit 50, and a light-emitting control circuit 70.

A first terminal of the storage capacitor circuit 10 is electrically coupled to a first node N1, and a second terminal of the storage capacitor circuit 10 is electrically coupled to a second node N2; a control electrode of the driving transistor 30 is electrically coupled to the first node N1; the writing circuit 60 is electrically coupled to the storage capacitor circuit 10, and the writing circuit 60 is configured to receive a writing control signal Sn and write a data voltage Vdt into the storage capacitor circuit 10 according to the writing control signal Sn; the reset circuit 40 is electrically coupled to the first node N1 and the second node N2, the reset circuit 40 is configured to receive a reset control signal Rn and reset the first node N1 and the second node N2 according to the reset control signal Rn, or receive the writing control signal Sn and/or a timing control signal Cn of an adjacent pixel row and reset the first node N1 and the second node N2 according to the writing control signal Sn and/or the timing control signal Cn of the adjacent pixel row; the threshold compensation circuit 50 is electrically coupled to the first node N1 and the driving transistor 30, the threshold compensation circuit 50 is configured to receive a compensation control signal ANn and write a compensation voltage to the first node N1 according to the compensation control signal ANn, where the compensation voltage includes at least a threshold voltage Vth of the driving transistor 30; the light-emitting control circuit 70 is coupled to the driving transistor 30 and the light-emitting element 20, and the light-emitting control circuit 70 is configured to receive a light-emitting control signal EMn and control the light-emitting element 20 to emit light according to the light-emitting control signal EMn, where the driving transistor 30 controls the light-emitting element 20 to emit light according to a voltage at the first node N1, and in a driving stage, the voltage at the first node N1 is a voltage generated by adding the data voltage Vdt and the compensation voltage.

It should be noted that the adjacent pixel row refer to a row above and a row below the current pixel row. For example, if the current pixel row is a second row, then the adjacent pixel row (i.e., the pixel row adjacent to the current pixel row) includes the row (i.e., a first row) above and the row (i.e., a third row) below the current pixel row.

In some implementations, as shown in FIGS. 2, 3, and 4, the reset control signal Rn is provided to the reset circuit 40 through a reset control line Rn1 (shown in FIG. 2) or the writing control signal Sn is provided to the reset circuit 40 through a writing control line Sn1 (shown in FIGS. 3 and 4), and the reset circuit 40 includes: a first transistor T1 and a second transistor T2, a first electrode of the first transistor T1 is electrically coupled to the first node N1, a second electrode of the first transistor T1 is electrically coupled to a first power supply line Vinit1, and a control electrode of the first transistor T1 is electrically coupled to the reset control line Rn1 (as shown in FIG. 2) or the writing control line Sn1 (as shown in FIGS. 3 and 4), where the first power supply line Vinit1 is configured to supply a first voltage Vinit to the reset circuit 40; a first electrode of the second transistor T2 is electrically coupled to the second node N2, a second electrode of the second transistor T2 is electrically coupled to a second power supply line Vref21, and a control electrode of the second transistor T2 is electrically coupled to the reset control line Rn1 (shown in FIG. 2) or the writing control line Sn1 (shown in FIGS. 3 and 4), where the second power supply line Vref21 is configured to supply a second voltage Vref2 to the reset circuit 40.

Note that the first voltage Vinit is a reset potential of the first node N1. The second voltage Vref2 is a reset potential of the second node N2, and a value of the second voltage Vref2 needs to match a dynamic value range of the data voltage Vdt output by a driving chip.

Further, in some implementations, as shown in FIGS. 2, 3, and 4, the reset circuit 40 further includes a potential holding circuit 401, the potential holding circuit 401 is coupled to the second node N2, the potential holding circuit 401 is configured to receive a compensation control signal AZn, and write the second voltage Vref2 to the second node N2 according to the compensation control signal AZn, where the compensation control signal AZn is provided to the potential holding circuit 401 through a compensation control line AZn1, and the potential holding circuit 401 includes: a third transistor T3, a first electrode of the third transistor T3 is electrically coupled to the second node N2, a second electrode of the third transistor T3 is electrically coupled to the second power supply line Vref21, and a control electrode of the third transistor T3 is electrically coupled to the compensation control line AZn1.

In some implementations, as shown in FIGS. 5 and 6, when the reset circuit 40 resets the first node N1 and the second node N2 according to the timing control signal Cn of the adjacent pixel row, the timing control signal Cn of the adjacent pixel row includes the compensation control signal AZn−1 of the previous pixel row and the light-emitting control signal EMn+1 of the next pixel row, the reset circuit 40 includes: a fourth transistor T4, a fifth transistor T5, and a sixth transistor T6, a first electrode of the fourth transistor T4 is electrically coupled to the first node N1, and a control electrode of the fourth transistor T4 is electrically coupled to the light-emitting control line EMn+1 of the next pixel row; a first electrode of the fifth transistor T5 is electrically coupled to a second electrode of the fourth transistor T4, a second electrode of the fifth transistor T5 is electrically coupled to the first power supply line Vinit1, and a control electrode of the fifth transistor T5 is electrically coupled to the compensation control line AZn−1 of the previous pixel row, where the first power supply line Vinit1 is configured to supply the first voltage Vinit to the reset circuit 40; a first electrode of the sixth transistor T6 is electrically coupled to the second node N2, a second electrode of the sixth transistor T6 is electrically coupled to the second power supply line Vref21, and a control electrode of the sixth transistor T6 is electrically coupled to the compensation control line AZn−1 of the previous pixel row, where the second power supply line Vref21 is configured to supply the second voltage Vref2 to the reset circuit 40.

It should be noted that the compensation control signal AZn−1 of the previous pixel row refers to the compensation control signal AZn−1 of the pixel row previous to the current pixel row, and the light-emitting control signal EMn+1 of the next pixel row refers to the light-emitting control signal EMn+1 of the pixel row next to the current pixel row. For example, if the current pixel row is the second pixel row, the compensation control signal AZn−1 of the previous pixel row is the compensation control signal AZn−1 of the first pixel row, and the light-emitting control signal EMn+1 of the next pixel row is the light-emitting control signal EMn+1 of the third pixel row.

In some implementations, as shown in FIGS. 2, 5, 6, 9, and 10, the data voltage Vdt is supplied to the writing circuit 60 through the data line Vdt1, and when the reset circuit 40 resets the first node N1 and the second node N2 according to the reset control signal Rn (as shown in FIG. 2) or the timing control signal Cn of the adjacent pixel row (as shown in FIGS. 5 and 6), the writing circuit 60 includes a seventh transistor T7, a first electrode of the seventh transistor T7 is electrically coupled to the data line Vdt1, a second electrode of the seventh transistor T7 is electrically coupled to the second node N2, and a control electrode of the seventh transistor T7 is electrically coupled to the writing control line Sn1; the storage capacitor circuit 10 includes a first capacitor C1 and a second capacitor C2, where a terminal of the first capacitor C1 is electrically coupled to the first node N1, and another terminal of the first capacitor C1 is electrically coupled to the second node N2; a terminal of the second capacitor C2 is electrically coupled to the first node N1 or the second node N2, and another terminal of the second capacitor C2 is electrically coupled to a third power supply line Vref11, where the third power supply line Vref11 is configured to provide a third voltage Vref1 to the storage capacitor circuit 10.

It should be noted that the third voltage Vref1 needs to be stable, and the value range thereof is not particularly limited.

In some implementations, as shown in FIG. 7, the reset circuit 40 resets the first node N1 and the second node N2 according to the writing control signal Sn and the timing control signal Cn of the adjacent pixel row, the timing control signal Cn of the adjacent pixel row includes the compensation control signal AZn−1 of the previous pixel row, the reset circuit 40 includes: an eighth transistor T8 and a ninth transistor T9, a first electrode of the eighth transistor T8 is electrically coupled to the first node N1, a second electrode of the eighth transistor T8 is electrically coupled to the first power supply line Vinit1, and a control electrode of the eighth transistor T8 is electrically coupled to the writing control line Sn1, where the first power supply line Vinit1 is configured to supply the first voltage Vinit to the reset circuit 40; a first electrode of the ninth transistor T9 is electrically coupled to the second node N2, a second electrode of the ninth transistor T9 is electrically coupled to the second power supply line Vref21, and a control electrode of the ninth transistor T9 is electrically coupled to the compensation control line AZn−1 of the previous pixel row, where the second power supply line Vref21 is configured to supply the second voltage Vref2 to the reset circuit 40.

In some implementations, as shown in FIGS. 3, 4, and 7, the data voltage Vdt is provided to the writing circuit 60 through the data line Vdt1, the reset circuit 40 writes the first voltage Vref1 and the second voltage Vref2 to the first node N1 and the second node N2 according to the writing control signal Sn (as shown in FIGS. 3 and 4) or writes the first voltage Vref1 and the second voltage Vref2 to the first node N1 and the second node N2 according to the writing control signal Sn and the timing control signal Cn of the adjacent pixel row (as shown in FIG. 7), the writing circuit 60 includes a tenth transistor T10, a first electrode of the tenth transistor T10 is electrically coupled to the data line Vdt1, and a control electrode of the tenth transistor T10 is electrically coupled to the writing control line Sn1; the storage capacitor circuit 10 includes a third capacitor C3 and a temporary storage circuit 101, a terminal of the third capacitor C3 is electrically coupled to the first node N1, another terminal of the third capacitor C3 is electrically coupled to the second node N2, a first terminal of the temporary storage circuit 101 is electrically coupled to the second node N2, a second terminal of the temporary storage circuit 101 is electrically coupled to a second electrode of the tenth transistor T10, and a control terminal of the temporary storage circuit 101 is electrically coupled to the light-emitting control line EMn1 for providing the light-emitting control signal EMn.

Further, in some implementations, as shown in FIG. 3, the temporary storage circuit 101 includes a fourth capacitor C4 and an eleventh transistor T11, where a first electrode of the eleventh transistor T11 is electrically coupled to the second node N2, a second electrode of the eleventh transistor T11 is electrically coupled to the second electrode of the tenth transistor T10, and a control electrode of the eleventh transistor T11 is electrically coupled to the light-emitting control line EMn1; a terminal of the fourth capacitor C4 is electrically coupled to the second electrode of the tenth transistor T10, and another terminal of the fourth capacitor C4 is electrically coupled to the third power supply line Vref11, where the third power supply line Vref11 is configured to supply a third voltage Vref1 to the temporary storage circuit 101.

Further, in some implementations, as shown in FIG. 4, the temporary storage circuit 101 includes a fifth capacitor C5 and a twelfth transistor T12, where a terminal of the fifth capacitor C5 is electrically coupled to the second node N2, and another terminal of the fifth capacitor C5 is electrically coupled to the second electrode of the tenth transistor T10; a first electrode of the twelfth transistor T12 is electrically coupled to the another terminal of the fifth capacitor C5, a second electrode of the twelfth transistor T12 is electrically coupled to the third power supply line Vref11, and a control electrode of the twelfth transistor T12 is electrically coupled to the light-emitting control line EMn1, where the third power supply line Vref11 is configured to supply a third voltage Vref1 to the temporary storage circuit 101.

In some implementations, as shown in FIG. 8, the writing control signal Sn is supplied to the reset circuit 40 through the writing control line Sn1, and the data voltage Vdt is supplied to the writing circuit 60 through the data line Vdt1, where the writing circuit 60 includes a thirteenth transistor T13, a first electrode of the thirteenth transistor T13 is electrically coupled to the data line Vdt1, a second electrode of the thirteenth transistor T13 is electrically coupled to the second node N2, and a control electrode of the thirteenth transistor T13 is electrically coupled to the writing control line Sn1; the reset circuit 40 shares the thirteenth transistor T13 with the writing circuit 60, the reset circuit 40 further includes a fourteenth transistor T14, a first electrode of the fourteenth transistor T14 is electrically coupled to the first node N1, a second electrode of the fourteenth transistor T14 is electrically coupled to the first power supply line Vinit1, and a control electrode of the fourteenth transistor T14 is electrically coupled to the writing control line Sn1, where the first power supply line Vinit1 is configured to supply the first voltage Vinit to the reset circuit 40; the storage capacitor circuit 10 includes a sixth capacitor C6 and a temporary storage circuit 101, where a terminal of the sixth capacitor C6 is electrically coupled to the first node N1, and another terminal of the sixth capacitor C6 is electrically coupled to the second node N2; the temporary storage circuit 101 includes a seventh capacitor C7, a fifteenth transistor T15, and a sixteenth transistor T16, a first electrode of the fifteenth transistor T15 is electrically coupled to the second node N2, a second electrode of the fifteenth transistor T15 is electrically coupled to a terminal of the seventh capacitor C7, and a control electrode of the fifteenth transistor T15 is electrically coupled to the writing control line Sn1; a first electrode of the sixteenth transistor T16 is electrically coupled to the second node N2, a second electrode of the sixteenth transistor T16 is electrically coupled to the terminal of the seventh capacitor C7, and a control electrode of the sixteenth transistor T16 is electrically coupled to a light-emitting control line EMn1 which supplies a light-emitting control signal EMn; another terminal of the seventh capacitor C7 is electrically coupled to a third power supply line Vref11, where the third power supply line Vref11 is configured to supply a third voltage Vref1 to the temporary storage circuit 101.

In some implementations, as shown in FIGS. 2, 3, 4, 5, 6, 7, and 8, the reset circuit 40 is further configured to reset an anode of the light-emitting element 20 according to the reset control signal Rn, the writing control signal Sn, or the timing control signal Cn of the adjacent pixel row, where the timing control signal Cn of the adjacent pixel row is the compensation control signal AZn−1 of the previous pixel row, and the reset circuit 40 further includes: a seventeenth transistor T17, a first electrode of the seventeenth transistor T17 is electrically coupled to the anode of the light-emitting element 20, a second electrode of the seventeenth transistor T17 is electrically coupled to the first power supply line Vinit1, and a control electrode of the seventeenth transistor T17 is electrically coupled to the reset control line Rn1 or the writing control line Sn1 (as shown in FIGS. 2, 3, 4, 7, and 8) or the compensation control line AZn−11 of the previous pixel row (as shown in FIGS. 5 and 6).

In some implementations, as shown in FIGS. 9 and 10, the reset circuit 40 is further configured to receive a compensation control signal AZn, and reset the first node N1 and the second node N2 according to the compensation control signal AZn and a timing control signal Cn of an adjacent pixel row, where the compensation control signal AZn is provided to the reset circuit 40 through a compensation control line AZn1, the timing control signal Cn of the adjacent pixel row includes a light-emitting control signal EMn−1 of a previous pixel row and a compensation control signal AZn+1 of a next pixel row, and the reset circuit 40 includes: an eighteenth transistor T18, a nineteenth transistor T19, and a blocking circuit 402, a first electrode of the eighteenth transistor T18 is electrically coupled to the second node N2, a second electrode of the eighteenth transistor T18 is electrically coupled to a second power supply line Vref21, and a control electrode of the eighteenth transistor T18 is electrically coupled to the compensation control line AZn1 of the current pixel row, where the second power supply line Vref21 is configured to supply a second voltage Vref2 to the reset circuit 40; a first electrode of the nineteenth transistor T19 is electrically coupled to the light-emitting control circuit 70, a second electrode of the nineteenth transistor T19 is electrically coupled to a first power supply line Vinit1, and a control electrode of the nineteenth transistor T19 is electrically coupled to the compensation control line AZn1 of the current pixel row, where the first power supply line Vinit1 is configured to supply a first voltage Vinit to the reset circuit 40; the blocking circuit 402 is electrically coupled between the threshold compensation circuit 50 and the driving transistor 30, or between the driving transistor 30 and a power supply VDD, the blocking circuit 402 is further coupled to the light-emitting control line EMn−1 of the previous pixel row and the compensation control line AZn+1 of the next pixel row, and the blocking circuit 402 is configured to be turned on or off according to the light-emitting control signal EMn−1 of the previous pixel row and the compensation control signal AZn+1 of the next pixel row; when the reset circuit 40 resets the first node N1 and the second node N2, the second voltage Vref2 is written into the second node N2 through the eighteenth transistor T18, the blocking circuit 402 is turned on under the control of the light-emitting control signal EMn−1 of the previous pixel row and the compensation control signal AZn+1 of the next pixel row, the light-emitting control circuit 70 is turned on under the control of the light-emitting control signal EMn, the threshold compensation circuit 50 is turned on under the control of the compensation control signal AZn, and the first voltage Vinit is written into the first node N1 through the nineteenth transistor T19, the light-emitting control circuit 70, and the threshold compensation circuit 50.

Furthermore, in some implementations, as shown in FIGS. 9 and 10, the driving transistor 30 includes a twenty-second transistor T22, the threshold compensation circuit 50 includes a twenty-third transistor T23, and the blocking circuit 402 includes: a twentieth transistor T20 and a twenty-first transistor T21, the twentieth transistor T20 is electrically coupled between the threshold compensation circuit 50 and the driving transistor 30 (in such case, a first electrode of the twentieth transistor T20 is electrically coupled to a second electrode of the twenty-second transistor T22, and a second electrode of the twentieth transistor T20 is electrically coupled to a second electrode of the twenty-third transistor T23), or between the driving transistor 30 and the power supply VDD (in such case, the first electrode of the twentieth transistor T20 is electrically coupled to the power supply VDD, and the second electrode of the twentieth transistor T20 is electrically coupled to a first electrode of the twenty-second transistor T22), and a control electrode of the twentieth transistor T20 is coupled to the light-emitting control line EMn−1 of the previous pixel row; the twenty-first transistor T21 is electrically coupled between the threshold compensation circuit 50 and the driving transistor 30 (in such case, the first electrode of the twenty-first transistor T21 is electrically coupled to the second electrode of the twenty-second transistor T22, and the second electrode of the twenty-first transistor T21 is electrically coupled to the second electrode of the twenty-third transistor T23), or between the driving transistor 30 and the power supply VDD (in such case, the first electrode of the twenty-first transistor T21 is electrically coupled to the power supply VDD, and the second electrode of the twenty-first transistor T21 is electrically coupled to the first electrode of the twenty-second transistor T22), and a control electrode of the twenty-first transistor T21 is coupled to the compensation control line AZn+1 of the next pixel row.

In some implementations, the light-emitting element 20 may be an organic light-emitting diode OLED, and the light-emitting control circuit 70 includes a twenty-fourth transistor T24.

It should be noted that, in the present disclosure, NPN type MOS transistors being used is taken as an example for explanation, and a case of PNP type MOS transistors being used is not described in detail.

An operation of the pixel circuit shown in FIG. 2 will be described with reference to FIG. 2*a*.

As shown in FIG. 2*a*, EMn is the light-emitting control signal supplied to the light-emitting control circuit 70, Rn is the reset control signal supplied to the reset circuit 40, AZn is the compensation control signal supplied to the threshold compensation circuit 50, and Sn is the writing control signal supplied to the writing circuit 60.

In a reset stage t1, the light-emitting control signal EMn, the compensation control signal AZn, and the writing control signal Sn are all at a high level, so that the seventh transistor T7, the third transistor T3, the twenty-fourth transistor T24, and the twenty-third transistor T23 are all turned off, the reset control signal Rn is at a low level, so that the first transistor T1, the second transistor T2, and the seventeenth transistor T17 are all turned on, the first voltage Vinit is written into the first node N1 and the anode of the organic light-emitting diode OLED through the first transistor T1 and the seventeenth transistor T17, respectively, so as to reset the first node N1 and the anode of the organic light-emitting diode OLED, in such case, the twenty-third transistor T23 is turned off, the organic light-emitting diode OLED does not emit light, and the second voltage Vref2 is written into the second node N2 through the second transistor T2, so as to reset the second node N2.

In a threshold voltage (Vth) detection stage t2, the light-emitting control signal EMn, the reset control signal Rn, and the writing control signal Sn are all at a high level, so that the first transistor T1, the second transistor T2, the seventeenth transistor T17, the seventh transistor T7, and the twenty-fourth transistor T24 are all turned off, the voltage of the first node N1 is held at a low potential by the first capacitor C1, therefore, the twenty-second transistor T22 is still turned off, the compensation control signal AZn is at a low level, so that the twenty-third transistor T23 and the third transistor T3 are both turned on, the second voltage Vref2 is written into the second node N2 through the third transistor T3, and a voltage Vdd−Vth is written into the first node N1, where, Vdd is the voltage of the power supply VDD, in such case, the voltage stored in the first capacitor C1 is Vdd−Vth−Vref2, and in this stage, the twenty-third transistor T23 writes information including voltage information of the power supply VDD and threshold voltage information of the driving transistor, i.e., the twenty-second transistor T22, into a terminal of the first capacitor C1.

In a data voltage (Vdt) refresh stage t3, the light-emitting control signal EMn, the reset control signal Rn, and the compensation control signal AZn are all at a high level, so that the first transistor T1, the second transistor T2, the third transistor T3, the seventeenth transistor T17, the twenty-third transistor T23, and the twenty-fourth transistor T24 are all turned off, the voltage of the first node N1 is maintained at Vdd−Vth by the first capacitor C1, the writing control signal Sn is at a low level, so that the seventh transistor T7 is turned on, and the data voltage Vdt is written into the second node N2 by the seventh transistor T7, in such case, due to the bootstrap effect of the first capacitor, the voltage of the first node N1 is Vdd−Vth+Vdt, which is a gate voltage of the driving transistor, i.e., the twenty-second transistor T22.

In a driving stage t4, the writing control signal Sn, the reset control signal Rn and the compensation control signal AZn are all at a high level, thus, the first transistor T1, the second transistor T2, the third transistor T3, the seventh transistor T7, the seventeenth transistor T17, and the twenty-third transistor T23 are all turned off, the voltage of the first node N1 is maintained at Vdd−Vth+Vdt by the first capacitor C1, the driving transistor, i.e., the twenty-second transistor T22, is turned on, the light-emitting control signal EMn is at a low level, accordingly, the twenty-fourth transistor T24 is turned on, so that under the control of the light-emitting control unit 70, the driving transistor, i.e., the twenty-second transistor T22, can control a current flowing to the organic light-emitting diode OLED according to information including the data voltage Vdt, the threshold voltage Vth of the driving transistor, i.e., the twenty-second transistor T22, and the power supply voltage Vdd, thereby controlling the light-emitting luminance of the organic light-emitting diode OLED.

It should be noted that the reset stage t1 of the current pixel row starts after the driving stage of the previous pixel row ends.

Therefore, the first node and the second node are reset through the reset circuit, a good circuit initialization reset effect can be achieved without adding any new driving timing, and therefore the accuracy of detection and compensation for threshold voltage can be improved.

An operation of the pixel circuits shown in FIGS. 3 and 4 will be described with reference to FIG. 3*a*.

As shown in FIG. 3*a*, EMn is the light-emitting control signal supplied to the light-emitting control circuit 70, AZn is the compensation control signal supplied to the threshold compensation circuit 50, and Sn is the writing control signal supplied to the writing circuit 60.

In a reset stage (data voltage (Vdt) refresh stage) t1, the light-emitting control signal EMn and the compensation control signal AZn are both at a high level, so that the twenty-third transistor T23, the third transistor T3, the eleventh transistor T11, and the twenty-fourth transistor T24 are all turned off, the writing control signal Sn is at a low level, so that the tenth transistor T10, the first transistor T1, the second transistor T2, and the seventeenth transistor T17 are all turned on, the first voltage Vinit is written into the first node N1 and the anode of the organic light-emitting diode OLED through the first transistor T1 and the seventeenth transistor T17, respectively, so as to reset the first node N1 and the anode of the organic light-emitting diode OLED, the second voltage Vref2 is written into the second node N2 through the second transistor T2, so as to reset the second node N2, the data voltage Vdt is written into the terminal of the fourth capacitor C4 through the tenth transistor T10 and is held by the fourth capacitor C4.

In a threshold voltage (Vth) detection stage t2, the light-emitting control signal EMn and the writing control signal Sn are both at a high level, so that the eleventh transistor T11, the tenth transistor T10, the first transistor T1, the second transistor T2, the seventeenth transistor T17, and the twenty-fourth transistor T24 are all turned off, the voltage of the first node N1 is held at a low potential by the third capacitor C3, therefore, the twenty-second transistor T22 is still turned off, the compensation control signal AZn is at a low level, so that the twenty-third transistor T23 and the third transistor T3 are both turned on, the second voltage Vref2 is written into the second node N2 through the third transistor T3, a voltage Vdd−Vth is written into the first node N1, where Vdd is the voltage of the power supply VDD, in such case, the voltage stored in the third capacitor C3 is Vdd−Vth−Vref2, and in this stage, the twenty-third transistor T23 writes information including voltage information of the power supply VDD and the threshold voltage information of the driving transistor, i.e., the twenty-second transistor T22, into the terminal of the third capacitor C3.

In a driving stage t4, the writing control signal Sn and the compensation control signal AZn are all at a high level, so that the first transistor T1, the second transistor T2, the third transistor T3, the tenth transistor T10, the seventeenth transistor T17 and the twenty-third transistor T23 are all turned off, the light-emitting control signal EMn is at a low level, the eleventh transistor T11 and the twenty-fourth transistor T24 are turned on, the data voltage Vdt held at the terminal of the fourth capacitor C4 is written into the second node N2 through the eleventh transistor T11, in such case, due to a bootstrap effect of the third capacitor C3, the voltage of the first node N1 is raised to Vdd−Vth+Vdt, the driving transistor, i.e., the twenty-second transistor T22 is turned on, so that under the control of the light-emitting control circuit 70, the driving transistor, i.e., the twenty-second transistor T22, can control a current flowing to the organic light-emitting diode OLED according to the information including the data voltage Vdt, the threshold voltage Vth of the driving transistor, i.e., the twenty-second transistor T22 and the power supply voltage Vdd, and further control the light-emitting luminance of the organic light-emitting diode OLED.

It should be noted that, the foregoing is a description of the operation of the pixel circuit shown in FIG. 3 with reference to FIG. 3a, and since the pixel circuit shown in FIG. 4 is different from that shown in FIG. 3 only in the structure of the temporary storage circuit 101, others are the same as those shown in FIG. 3, and are not repeated herein. It should be noted that, in the threshold voltage (Vth) detection stage, the fourth capacitor C4 needs to participate in the threshold voltage (Vth) detection and charging process, and it is difficult to maintain the data voltage at the terminal of the fourth capacitor C4 synchronously, so the pixel circuits shown in FIGS. 3 and 4 are only applicable to the case where the data voltage Vdt and the threshold voltage Vth are coupled in series through a capacitor.

In addition, in the pixel circuits shown in FIGS. 3 and 4, compared with the pixel circuit shown in FIG. 2, the data voltage (Vdt) refresh stage is advanced to the threshold voltage (Vth) detection stage, that is, the data voltage (Vdt) refresh stage and the reset stage are started by the same timing sequence, and after the refresh, the data voltage (Vdt) is temporarily stored in the temporary storage circuit 101 of the pixel circuits shown in FIGS. 3 and 4.

An operation of the pixel circuits shown in FIGS. 5 and 6 will be described with reference to FIG. 5a.

As shown in FIG. 5a, EMn is the light-emitting control signal provided to the light-emitting control circuit 70 for the current pixel row, EMn+1 is the light-emitting control signal provided to the light-emitting control circuit 70 for the next pixel row, AZn−1 is the compensation control signal provided to the threshold compensation circuit 50 for the previous pixel row, AZn is the compensation control signal provided to the threshold compensation circuit 50 for the current pixel row, and Sn is the writing control signal provided to the writing circuit 60 for the current pixel row.

In the reset stage t1, the light-emitting control signal EMn, the writing control signal Sn, and the compensation control signal AZn are all at a high level, so that the twenty-fourth transistor T24, the twenty-third transistor T23, and the seventh transistor T7 are all turned off, the compensation control signal AZn−1 of the previous pixel row and the light-emitting control signal EMn+1 of the next pixel row are at a low level, so that the fourth transistor T4, the fifth transistor T5, the sixth transistor T6, and the seventeenth transistor T17 are all turned on, the first voltage Vinit is written into the first node N1 and the anode of the organic light-emitting diode OLED through the fourth transistor T4, the fifth transistor T5, and the seventeenth transistor T17, respectively, so as to reset the first node N1 and the anode of the organic light-emitting diode OLED, and the second voltage Vref2 is written into the second node N2 through the sixth transistor T6, so as to reset the second node N2.

In a threshold voltage (Vth) detection stage t2 which can be divided into two stages t21 and t22, in the stage t21, the light-emitting control signal EMn, the writing control signal Sn and the light-emitting control signal EMn+1 of the next pixel row are all at a high level, so that the seventh transistor T7, the fourth transistor T4 and the twenty-fourth transistor T24 are all turned off, the compensation control signal AZn and the compensation control signal AZn−1 of the previous pixel row are at a low level, so that the twenty-third transistor T23 and the fifth transistor T5, the sixth transistor T6 and the seventeenth transistor T17 are all turned on, the second voltage Vref2 is written into the second node N2 through the sixth transistor T6, a voltage Vdd−Vth is written into the first node N1, where, Vdd is the voltage of the power supply VDD, in such case, the voltage stored in the first capacitor C1 is Vdd−Vth−Vref2, in the stage t22, the compensation control signal AZn−1 of the previous pixel row is changed into a high level, the fifth transistor T5, the sixth transistor T6, and the seventeenth transistor T17 are all turned off.

In a data voltage (Vdt) refresh stage t3, the light-emitting control signal EMn, the compensation control signal AZn, the compensation control signal AZn−1 of the previous pixel row, and the light-emitting control signal EMn+1 of the next pixel row are all at a high level, so that the fourth transistor T4, the fifth transistor T5, the sixth transistor T6, the seventeenth transistor T17, the twenty-fourth transistor T24, and the twenty-third transistor T23 are all turned off, the writing control signal Sn is at a low level, so that the seventh transistor T7 is turned on, the data voltage Vdt is written into the second node N2 through the seventh transistor T7, and in such case, due to the bootstrap effect of the first capacitor C1, the voltage of the first node N1 is raised to Vdd−Vth+Vdt, and the driving transistor, i.e., the twenty-second transistor T22, is turned on.

In a driving stage t4, the writing control signal Sn, the compensation control signal AZn, the compensation control signal AZn−1 of the previous pixel row, and the light-emitting control signal EMn+1 of the next pixel row are all at a high level, so that the fourth transistor T4, the fifth transistor T5, the sixth transistor T6, the seventeenth transistor T17, the seventh transistor T7, and the twenty-third transistor T23 are all turned off, the light-emitting control signal EMn is at a low level, the twenty-fourth transistor T24 is turned on, in such case, a gate voltage of the driving transistor, i.e., the twenty-second transistor T22, is maintained at Vdd−Vth+Vdt by the first capacitor C3, and the driving transistor, i.e., the twenty-second transistor T22, is turned on, so that the driving transistor, i.e., the twenty-second transistor T22, can control a current flowing to the organic light-emitting diode according to information including the data voltage Vdt, the threshold voltage of the driving transistor, i.e., the twenty-second transistor T22, and the power supply voltage Vdd, and further control the light-emitting luminance of the organic light-emitting diode OLED.

It should be noted that, the foregoing is a description of the operation of the pixel circuit shown in FIG. 5 with reference to FIG. 5a, and since the pixel circuit shown in FIG. 6 is different from that shown in FIG. 5 only in that the electrical connection positions of the second capacitor C2 are different, others are the same as those shown in FIG. 5, and are not repeated herein.

Therefore, in the pixel circuits shown in FIGS. 5 and 6, the fourth transistor T4, the fifth transistor T5, the sixth transistor T6 and the seventeenth transistor T17 are controlled by the timing control signal of the adjacent pixel row, so that the function of the reset circuit is effectively realized, a good circuit initialization reset effect is further realized, and the accuracy of detection and compensation for threshold voltage is improved.

An operation of the pixel circuit shown in FIG. 7 will be described with reference to FIG. 7*a*. It should be noted that the structure and the electrical connection relationship of the temporary storage circuit 101 in the pixel circuit shown in FIG. 7 are the same as those in the pixel circuits shown in FIG. 3 and FIG. 4.

As shown in FIG. 7*a*, EMn is the light-emitting control signal provided to the light-emitting control circuit 70 for the current pixel row, AZn−1 is the compensation control signal provided to the threshold compensation circuit 50 for the previous pixel row, AZn is the compensation control signal provided to the threshold compensation circuit 50 for the current pixel row, and Sn is the writing control signal provided to the writing circuit 60 for the current pixel row.

In a reset stage (data voltage (Vdt) refresh stage) t1, the light-emitting control signal EMn and the compensation control signal AZn are both at a high level, so that the twenty-fourth transistor T24 and the twenty-third transistor T23 are all turned off, the compensation control signal AZn−1 of the previous pixel row and the writing control signal Sn are at a low level, so that the eighth transistor T8, the ninth transistor T9, the tenth transistor T10, and the seventeenth transistor T17 are all turned on, the first voltage Vinit is written into the first node N1 and the anode of the organic light-emitting diode OLED through the eighth transistor T8 and the seventeenth transistor T17, respectively, so as to reset the first node N1 and the anode of the organic light-emitting diode OLED, the second voltage Vref2 is written into the second node N2 through the ninth transistor T9, so as to reset the second node N2, the data voltage Vdt1 is written into the temporary storage circuit 101 through the tenth transistor T10 and is held by the temporary storage circuit 101.

In a threshold voltage (Vth) detection stage t2 which can be divided into two stages, i.e. t21 and t22, in the stage t21, the light-emitting control signal EMn and the writing control signal Sn are both at a high level, so that the eighth transistor T8, the tenth transistor T10, the seventeenth transistor T17, the twenty-fourth transistor T24 and the temporary storage circuit 101 are all turned off, the compensation control signal AZn and the compensation control signal AZn−1 of the previous pixel row are at a low level, so that the twenty-third transistor T23 and the ninth transistor T9 are both turned on, the second voltage Vref2 is written into the second node N2 through the ninth transistor T9, a voltage Vdd−Vth is written into the first node N1, where Vdd is the voltage of the power supply VDD, in such case, the voltage stored by the third capacitor C3 is Vdd−Vth−Vref2, in the stage T22, the compensation control signal AZn−1 of the previous pixel row changes into a high level, and the ninth transistor T9 is turned off.

In a driving stage t4, the compensation control signal AZn, the compensation control signal AZn−1 of the previous pixel row and the writing control signal Sn are all at a high level, so that the ninth transistor T9, the eighth transistor T8, the tenth transistor T10, the seventeenth transistor T17 and the twenty-third transistor T23 are all turned off, the light-emitting control signal EMn is at a low level, so that the twenty-fourth transistor T24 and the temporary storage circuit 101 are turned on, the data voltage Vdt is written into the second node N2 through the temporary storage circuit 101, in such case, due to the bootstrap effect of the third capacitor C3, the voltage of the first node N1 is raised to Vdd−Vt+Vdt, and the driving transistor, i.e., the twenty-second transistor T22, is turned on, so that under the control of the light-emitting control unit 70, the driving transistor, i.e., the twenty-second transistor T22, can control a magnitude of a current flowing to the organic light-emitting diode OLED according to information including the data voltage Vdt, the threshold voltage of the driving transistor, i.e., the twenty-second transistor T22, and the power supply voltage Vdd, and further control the light-emitting luminance of the organic light-emitting diode OLED.

Therefore, compared with the pixel circuits shown in FIGS. 3 and 4, in the pixel circuit shown in FIG. 7, the compensation control signal Azn−1 of the previous pixel row is used, and the functions of the second transistor T2 and the third transistor T3 in the pixel circuits shown in FIGS. 3 and 4 can be realized by only one ninth transistor T9, so as to achieve the purpose of simplifying the pixel circuit.

An operation of the pixel circuit shown in FIG. 8 will be described with reference to FIG. 8*a*.

As shown in FIG. 8*a*, EMn is the light-emitting control signal provided to the light-emitting control circuit 70 for the current pixel row, AZn is the compensation control signal provided to the threshold compensation circuit 50 for the current pixel row, and Sn is the writing control signal provided to the writing circuit 60 for the current pixel row.

In a reset stage (data voltage (Vdt) refresh stage) t1, the light-emitting control signal EMn and the compensation control signal AZn are both at a high level, so that the sixteenth transistor T16, the twenty-fourth transistor T24, and the twenty-third transistor T23 are all turned off, the writing control signal Sn is at a low level, so that the thirteenth transistor T13, the fourteenth transistor T14, the fifteenth transistor T15, and the seventeenth transistor T17 are all turned on, the first voltage Vinit is written into the first node N1 and the anode of the organic light-emitting diode OLED through the fourteenth transistor T14 and the seventeenth transistor T17, respectively, so as to reset the first node N1 and the anode of the organic light-emitting diode OLED, the data voltage Vdt is written into the second node N2 through the thirteenth transistor T13, so as to reset the second node N2, and the data voltage Vdt is written into the terminal of the seventh capacitor C7 through the fifteenth transistor T15 and is held by the seventh capacitor C7.

In a threshold voltage (Vth) detection stage t2, the light-emitting control signal EMn and the writing control signal Sn are both at a high level, so that the thirteenth transistor T13, the fourteenth transistor T14, the fifteenth transistor T15, the seventeenth transistor T17, the twenty fourth transistor T24, and the sixteenth transistor T16 are all turned off, the compensation control signal AZn is at a low level, so that the twenty-third transistor T23 and the twenty-fifth transistor T25 are all turned on, the second voltage Vref2 is written into the second node N2 through the twenty-fifth transistor T25, and a voltage Vdd−Vth is written into the first node N1, where Vdd is a voltage of the power supply VDD, and in such case, the voltage stored by the sixth capacitor C6 is Vdd−Vth−Vref2.

In a driving stage t4, the compensation control signal AZn and the writing control signal Sn are all at a high level, so that the thirteenth transistor T13, the fourteenth transistor T14, the fifteenth transistor T15, the seventeenth transistor T17, the twenty-third transistor T23 and the twenty-fifth transistor T25 are all turned off, the light-emitting control signal EMn is at a low level, so that the twenty-fourth transistor T24 and the sixteenth transistor T16 are turned on, the data voltage Vdt held by the seventh capacitor C7 is written into the second node N2 through the sixteenth transistor T16, in such case, due to a bootstrap effect of the sixth capacitor C6, the voltage of the first node N1 is raised to Vdd−Vth+Vdt, the driving transistor, i.e., the twenty-second transistor T22, is turned on, so that under the control of the light-emitting control unit 70, the driving transistor, i.e., the twenty-second transistor T22, can control a magnitude of a current flowing to the organic light-emitting diode according to information including the data voltage Vdt, the threshold voltage Vth of the driving transistor, i.e., the twenty-second transistor T22, and the power supply voltage Vdd, and further control the light-emitting luminance of the organic light-emitting diode OLED.

Therefore, in the pixel circuit shown in FIG. 8, the data voltage Vdt is used as the reset reference voltage of the second node N2 in the reset stage, so that a good circuit initialization reset effect can be achieved, and the accuracy of detection and compensation for threshold voltage can be further improved.

An operation of the pixel circuits shown in FIGS. 9 and 10 will be described with reference to FIG. 9*a*.

As shown in FIG. 9*a*, EMn−1 is the light-emitting control signal provided to the light-emitting control circuit 70 for the previous pixel row, EMn is the light-emitting control signal provided to the light-emitting control circuit 70 for the current pixel row, AZn is the compensation control signal provided to the threshold compensation circuit 50 for the current pixel row, AZn+1 is the compensation control signal provided to the threshold compensation circuit 50 for the next pixel row, and Sn is the writing control signal provided to the writing circuit 60 for the current pixel row.

In a reset stage t1, the light-emitting control signal EMn−1 of the previous pixel row, the compensation control signal AZn+1 of the next pixel row and the writing control signal Sn are all at a high level, so that the twenty-first transistor T21, the twentieth transistor T20, and the seventh transistor T7 are all turned off, the light-emitting control signal EMn of the current pixel row and the compensation control signal AZn of the current pixel row are at a low level, so that the eighteenth transistor T18, the nineteenth transistor T19, the twenty-third transistor T23, and the twenty-fourth transistor T24 are all turned on, the first voltage Vinit is written into the first node N1 through the nineteenth transistor T19, the twenty-fourth transistor T24, the twenty-third transistor T23, so as to reset the first node N1, the first voltage Vinit is written into the anode of the organic light-emitting diode OLED through the nineteenth transistor T19 to reset the anode of the organic light-emitting diode OLED.

In a threshold voltage (Vth) detection stage t2, the light-emitting control signal EMn of the current pixel row, the light-emitting control signal EMn−1 of the previous pixel row, and the writing control signal Sn are all at a high level, so that the seventh transistor T7, the twenty-fourth transistor T24, and the twentieth transistor T20 are all turned off, the compensation control signal AZn of the current pixel row and the compensation control signal AZn+1 of the next pixel row are at a low level, so that the eighteenth transistor T18, the nineteenth transistor T19, the twenty-third transistor T23, and the twenty-first transistor T21 are all turned on, the second voltage Vref2 is written into the second node N2 through the eighteenth transistor T18, and a voltage Vdd−Vth is written into the first node N1, where Vdd is the voltage of the power supply VDD, and in such case, the voltage stored in the first capacitor C1 is Vdd−Vth−Vref2.

In a data voltage (Vdt) refresh stage t3, the light-emitting control signal EMn of the current pixel row, the compensation control signal AZn of the current pixel row are at a high level, and thus the eighteenth transistor T18, the nineteenth transistor T19, the twenty-fourth transistor T24, and the twenty-third transistor T23 are all turned off, the writing control signal Sn and the compensation control signal AZn+1 of the next pixel row are at a low level, the light-emitting control signal EMn−1 of the previous pixel row is at a low level, and thus the seventh transistor T7, the twenty-first transistor T21, and the twentieth transistor T20 are all turned on, the data voltage Vdt is written into the second node N2 through the seventh transistor T7, and in such case, due to the bootstrap effect of the first capacitor C1, the voltage of the first node N1 is raised to Vdd−Vth+Vdt, and the driving transistor, i.e., the twenty-second transistor T22, is turned on.

In a driving stage t4, the compensation control signal AZn+1 of the next pixel row, the compensation control signal AZn of the current pixel row and the writing control signal Sn are all at a high level, so that the seventh transistor T7, the twenty-first transistor T21, the eighteenth transistor T18, the nineteenth transistor T19 and the twenty-third transistor T23 are all turned off, the light-emitting control signal EMn−1 of the previous pixel row and the light-emitting control signal EMn of the current pixel row are at a low level, so that the twenty-fourth transistor T24 and the twentieth transistor T20 are turned on, a gate voltage of the driving transistor, i.e., the twenty-second transistor T22, is maintained at Vdd−Vth+Vdt by the first capacitor, the driving transistor, i.e., the twenty-second transistor T22, is turned on, so that under the control of the light-emitting circuit 70, the driving transistor, i.e., the twenty-second transistor T22, can control a magnitude of a current flowing to the organic light-emitting diode OLED according to information including the data voltage Vdd, the threshold voltage of the driving transistor, i.e., the twenty-second transistor T22, and the power supply voltage Vdd, and further control the light-emitting luminance of the organic light-emitting diode OLED.

It should be noted that, the foregoing is a description of the operation of the pixel circuit shown in FIG. 9 with reference to FIG. 9*a*, and since the pixel circuit shown in FIG. 10 is different from that shown in FIG. 9 only in that the electrical connection position of the second capacitor C2 is different, others are the same as those shown in FIG. 9, and are not repeated herein.

Thus, in the pixel circuits shown in FIGS. 9 and 10, the direct current (DC) path between the power supply and a power source vss is temporarily blocked in the reset stage by providing the blocking circuit 402, thereby preventing the organic light-emitting diode OLED from emitting light and avoiding ineffective DC power consumption.

Therefore, with the pixel circuits shown in FIGS. 2 to 10, the reset circuit resets the first node and the second node, and a good circuit initialization reset effect can be achieved without adding any new driving timing sequence, so that the accuracy of detection and compensation for threshold voltage can be improved.

In summary, the pixel circuits according to the embodiment of the disclosure each receive the writing control signal through the writing circuit and write the data voltage into the storage capacitor circuit according to the writing control signal, receive the reset control signal through the reset circuit and reset the first node and the second node according to the reset control signal, or receive the writing control signal and/or the timing control signal of the adjacent pixel row through the reset circuit and reset the first node and the second node according to the writing control signal and/or the timing control signal of the adjacent pixel row, receive the compensation control signal through the threshold compensation circuit and write the compensation voltage to the first node according to the compensation control signal, where the compensation voltage includes at least the threshold voltage of the driving transistor; receive the light-emitting control signal through the light-emitting control circuit and control the light-emitting element to emit light according to the light-emitting control signal, where the driving transistor controls the light-emitting element to emit light according to the voltage of the first node, and the voltage of the first node in the driving stage is a voltage that is generated by adding the data voltage and the compensation voltage. Therefore, the pixel circuit provided by the embodiment of the present disclosure reset the first node and the second node through the reset circuit, so that a good circuit initialization reset effect can be realized without adding any new driving timing sequence, and further, the accuracy of detection and compensation for threshold voltage can be improved.

Based on the pixel circuits of the above embodiment, an embodiment of the present disclosure further provides a display panel including any one of the pixel circuits described above.

According to the display panel provided by the embodiment of the present disclosure, with the pixel circuit, a good circuit initialization reset effect can be realized without adding any new driving timing sequence, and further, the accuracy of detection and compensation for threshold voltage can be improved.

Based on the pixel circuits of the above embodiment, an embodiment of the present disclosure further provides a method for driving any of the pixel circuits.

FIG. 11 is a flowchart illustrating a method for driving a pixel circuit according to an embodiment of the present disclosure. As shown in FIG. 11, the method for driving the pixel circuit according to the embodiment of the present disclosure includes the steps of:

S1, receiving the writing control signal, and writing the data voltage into the storage capacitor circuit according to the writing control signal;

S2, receiving the reset control signal and resetting the first node and the second node according to the reset control signal, or receiving the writing control signal and/or the timing control signal of an adjacent pixel row and resetting the first node and the second node according to the writing control signal and/or the timing control signal of the adjacent pixel row;

S3, receiving the compensation control signal, and writing the compensation voltage into the first node according to the compensation control signal, where the compensation voltage includes at least the threshold voltage of the driving transistor; and S4, receiving the light-emitting control signal, and controlling the light-emitting element to emit light according to the light-emitting control signal, where the driving transistor controls the light-emitting element to emit light according to the voltage of the first node, and the voltage of the first node in the driving stage is the voltage generated by adding the data voltage and the compensation voltage.

It should be noted that the foregoing explanation of the pixel circuits in the above embodiment is also applicable to the method for driving the pixel circuit of this embodiment, and is not repeated herein.

To sum up, according to the method for driving the pixel circuit of the embodiment of the present disclosure, the writing control signal is received first, the data voltage is written into the storage capacitor circuit according to the writing control signal, then the reset control signal is received, and the first node and the second node are reset according to the reset control signal, or the writing control signal and/or the timing control signal of the adjacent pixel row is received, the first node and the second node are reset according to the writing control signal and/or the timing control signal of the adjacent pixel row; the compensation control signal is received, and the compensation voltage is written into the first node according to the compensation control signal, where the compensation voltage includes at least the threshold voltage of the driving transistor; the light-emitting control signal is received, and the light-emitting element is controlled to emit light according to the light-emitting control signal, where the driving transistor controls the light-emitting element to emit light according to the voltage of the first node, the voltage of the first node in the driving stage is a voltage generated by adding the data voltage and the compensation voltage. Therefore, the method for driving the pixel circuit in the embodiment of the present disclosure can realize a good circuit initialization reset effect without adding any new driving timing sequence, and further can improve the accuracy of detection and compensation for threshold voltage.

In the description of the present specification, reference to the description of "an embodiment," "some implementations," "an implementation," "an example," or the like means that a particular feature, structure, material, or characteristic described in connection with the embodiment, implementation or example is included in at least one embodiment, implementation or example of the present disclosure. In this specification, the schematic representations of the terms used above are not necessarily intended to refer to the same embodiment, implementation or example. Furthermore, the particular feature, structure, material, or characteristic described may be combined in any suitable manner in any one or more embodiments, implementations or examples. Moreover, various embodiments, implementations or examples, and features of various embodiments, implementations or examples described in this specification can be conjoined and combined by one skilled in the art without contradiction.

Furthermore, the terms "first", "second" are used for descriptive purposes only and are not to be construed as indicating or implying relative importance or to implicitly indicate the number of technical features indicated. Thus, a feature defined by "first" or "second" may explicitly or implicitly that at least one the feature is included. In the description of the present disclosure, "plurality" means at least two, e.g., two, three, etc., unless explicitly defined otherwise.

Any process or method descriptions in flow charts or otherwise described herein may be understood as representing circuits, segments, or portions of codes which include one or more executable instructions for implementing steps of custom logic functions or processes, and alternate implementations are included within the scope of the embodiment of the present disclosure in which functions may be executed out of order from that shown or discussed, including substantially concurrently or in reverse order, depending on the functionality involved, as would be understood by those reasonably skilled in the art of the embodiments of the present disclosure.

The logic and/or steps represented in the flowchart or otherwise described herein, such as an ordered listing of executable instructions that can be considered to implement logical functions, can be embodied in any computer-readable medium for use by or in connection with an instruction execution system, apparatus, or device (such as a computer-based system, processor-containing system, or other system that can fetch the instructions from the instruction execution system, apparatus, or device and execute the instructions).

For the purposes of this description, a "computer-readable medium" can be any means that can contain, store, communicate, propagate, or transport the program for use by or in connection with the instruction execution system, apparatus, or device. More specific examples (a non-exhaustive list) of the computer-readable medium would include the following: an electrical connection having one or more wires to a portion (electronic device), a portable computer diskette (magnetic device), a Random Access Memory (RAM), a read-only memory (ROM), an erasable programmable read-only memory (EPROM or flash memory), an optical fiber device, and a portable compact disc read-only memory (CDROM). Further, the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be understood that portions of the present disclosure may be implemented in hardware, software, firmware, or a combination thereof. In the above embodiments, various steps or methods may be implemented in software or firmware stored in a memory and executed by a suitable instruction execution system. If implemented in hardware, as in another embodiment, any one or combination of the following techniques, which are well known in the art, may be used: a discrete logic circuit having a logic gate circuit for implementing a logic function on a data signal, an application specific integrated circuit having an appropriate combinational logic gate circuit, a Programmable Gate Array (PGA), a Field Programmable Gate Array (FPGA), or the like.

It will be understood by those skilled in the art that all or part of the steps carried out in the method of implementing the above embodiments may be implemented by hardware related to instructions of a program, which may be stored in a computer readable storage medium, and the program, when executed, includes one or a combination of the steps of the embodiments of the method.

In addition, functional units in the embodiments of the present disclosure may be integrated into one processing circuit, or each unit may exist alone physically, or two or more units are integrated into one circuit. The integrated circuit can be realized in a hardware mode, and can also be realized in a software functional circuit mode. The integrated circuit, if implemented in software functional circuit mode and sold or used as a stand-alone product, may also be stored in a computer-readable storage medium.

The storage medium mentioned above may be a read-only memory, a magnetic or optical disk, etc. While embodiments of the present disclosure have been shown and described above, it will be understood that the above embodiments are exemplary and not to be construed as limiting the present disclosure, and that changes, modifications, substitutions and alterations may be made to the above embodiments by those of ordinary skill in the art within the scope of the present disclosure.

The invention claimed is:

1. A pixel circuit, comprising:

a storage capacitor circuit, a first terminal of the storage capacitor circuit being electrically coupled to a first node, a second terminal of the storage capacitor circuit being electrically coupled to a second node;

a light-emitting element;

a driving transistor having a control electrode electrically coupled to the first node;

a writing circuit electrically coupled to the storage capacitor circuit and configured to receive a writing control signal and write a data voltage into the storage capacitor circuit according to the writing control signal;

a reset circuit electrically coupled to the first node and the second node, the reset circuit being configured to receive the writing control signal and/or a timing control signal of an adjacent pixel row and reset the first node and the second node according to the writing control signal and/or the timing control signal of the adjacent pixel row;

a threshold compensation circuit electrically coupled to the first node and the driving transistor, the threshold compensation circuit being configured to receive a compensation control signal and write a compensation voltage into the first node according to the compensation control signal, wherein the compensation voltage includes at least a threshold voltage of the driving transistor; and a light-emitting control circuit electrically coupled to the driving transistor and the light-emitting element and being configured to receive a light-emitting control signal and control the light-emitting element to emit light according to the light-emitting control signal, wherein the driving transistor controls the light-emitting element to emit light according to a voltage of the first node, and the voltage of the first node in a driving stage is a voltage generated by adding the data voltage and the compensation voltage.

2. The pixel circuit according to claim 1, wherein the reset circuit is configured to receive the the writing control signal supplied through a writing control line, and the reset circuit comprises:

a first transistor having a first electrode electrically coupled to the first node, a second electrode electrically coupled to a first power supply line, and a control electrode electrically coupled to the writing control line, wherein the first power supply line is configured to supply a first voltage to the reset circuit;

a second transistor having a first electrode electrically coupled to the second node, a second electrode electrically coupled to a second power supply line, and a control electrode electrically coupled to the writing control line, wherein the second power supply line is configured to supply a second voltage to the reset circuit.

3. The pixel circuit according to claim 2, wherein the reset circuit further comprises a potential holding circuit electrically coupled to the second node, the reset circuit is configured to receive the compensation control signal and write the second voltage to the second node according to the compensation control signal, wherein the compensation control signal is supplied to the potential holding circuit through a compensation control line, and the potential holding circuit comprises:

a third transistor having a first electrode electrically coupled to the second node, a second electrode electrically coupled to the second power supply line, and a control electrode electrically coupled to the compensation control line.

4. The pixel circuit according to claim 2, wherein the writing circuit is configured to receive the data voltage supplied through a data line, and the reset circuit is configured to reset the first node and the second node according to the reset control signal, wherein the writing circuit comprises a seventh transistor having a first electrode electrically coupled to the data line, a second electrode electrically coupled to the second node, and a control electrode electrically coupled to the writing control line;

the storage capacitor circuit comprises a first capacitor and a second capacitor, wherein a terminal of the first capacitor is electrically coupled to the first node, and another terminal of the first capacitor is electrically coupled to the second node; a terminal of the second capacitor is electrically coupled to the first node or the second node, and another terminal of the second capacitor is electrically coupled to a third power supply line, wherein the third power supply line is configured to provide a third voltage to the storage capacitor circuit.

5. The pixel circuit according to claim 2, wherein the writing circuit is configured to receive the data voltage supplied through a data line, and the reset circuit is configured to write the first voltage and the second voltage to the first node and the second node, respectively, according to the writing control signal, or write the first voltage and the second voltage to the first node and the second node, respectively, according to the writing control signal and the timing control signal of the adjacent pixel row, the writing circuit comprises a tenth transistor having a first electrode electrically coupled to the data line, and a control electrode electrically coupled to the writing control line;

the storage capacitor circuit comprises a third capacitor and a temporary storage circuit, wherein a terminal of the third capacitor is electrically coupled to the first node, another terminal of the third capacitor is electrically coupled to the second node, a first terminal of the temporary storage circuit is electrically coupled to the second node, a second terminal of the temporary storage circuit is electrically coupled to a second electrode of the tenth transistor, and a control terminal of the temporary storage circuit is electrically coupled to a light-emitting control line for providing the light-emitting control signal.

6. The pixel circuit according to claim 5, wherein the temporary storage circuit comprises a fourth capacitor and an eleventh transistor, wherein a first electrode of the eleventh transistor is electrically coupled to the second node, a second electrode of the eleventh transistor is electrically coupled to the second electrode of the tenth transistor, and a control electrode of the eleventh transistor is electrically coupled to the light-emitting control line; a terminal of the fourth capacitor is electrically coupled to the second electrode of the tenth transistor, and another terminal of the fourth capacitor is electrically coupled to a third power supply line, wherein the third power supply line is configured to provide a third voltage to the temporary storage circuit.

7. The pixel circuit according to claim 5, wherein the temporary storage circuit comprises a fifth capacitor and a twelfth transistor, wherein a terminal of the fifth capacitor is electrically coupled to the second node, and another terminal of the fifth capacitor is electrically coupled to the second electrode of the tenth transistor; a first electrode of the twelfth transistor is electrically coupled to the another terminal of the fifth capacitor, a second electrode of the twelfth transistor is electrically coupled to a third power supply line, and a control electrode of the twelfth transistor is electrically coupled to the light-emitting control line, wherein the third power supply line is configured to provide a third voltage to the temporary storage circuit.

8. The pixel circuit according to claim 1, wherein the reset circuit is configured to reset the first node and the second node according to the timing control signal of the adjacent pixel row, the timing control signal of the adjacent pixel row comprises a compensation control signal of a previous pixel row and a light-emitting control signal of a next pixel row, the reset circuit comprising:

a fourth transistor having a first electrode electrically coupled to the first node, and a control electrode electrically coupled to the light-emitting control line of the next pixel row;

a fifth transistor having a first electrode electrically coupled to a second electrode of the fourth transistor, a second electrode electrically coupled to a first power supply line, a control electrode electrically coupled to the compensation control line of the previous pixel row, wherein the first power supply line is configured to supply a first voltage to the reset circuit;

a sixth transistor having a first electrode electrically coupled to the second node, a second electrode electrically coupled to a second power supply line, and a control electrode electrically coupled to the compensation control line of the previous pixel row, wherein the second power supply line is configured to supply a second voltage to the reset circuit.

9. The pixel circuit of claim 8, wherein the writing circuit is configured to receive the data voltage supplied through a data line, wherein the writing circuit comprises a seventh transistor having a first electrode electrically coupled to the data line, a second electrode electrically coupled to the second node, and a control electrode electrically coupled to the writing control line;

the storage capacitor circuit comprises a first capacitor and a second capacitor, wherein a terminal of the first capacitor is electrically coupled to the first node, and another terminal of the first capacitor is electrically coupled to the second node; a terminal of the second capacitor is electrically coupled to the first node or the second node, and another terminal of the second capacitor is electrically coupled to a third power supply line, wherein the third power supply line is configured to supply a third voltage to the storage capacitor circuit.

10. The pixel circuit according to claim 1, wherein the reset circuit is configured to reset the first node and the second node according to the writing control signal and the timing control signal of the adjacent pixel row, the timing control signal of the adjacent pixel row comprising a compensation control signal of a previous pixel row, the reset circuit comprising:

an eighth transistor having a first electrode electrically coupled to the first node, a second electrode electrically coupled to a first power supply line, and a control electrode electrically coupled to the writing control line, wherein the first power supply line is configured to supply a first voltage to the reset circuit;

a ninth transistor having a first electrode electrically coupled to the second node, a second electrode electrically coupled to a second power supply line, and a control electrode electrically coupled to the compensation control line of the previous pixel row, wherein the second power supply line is configured to supply a second voltage to the reset circuit.

11. The pixel circuit according to claim 10, wherein the writing circuit is configured to receive the data voltage supplied through a data line, and the reset circuit is configured to write the first voltage and the second voltage to the first node and the second node, respectively, according to the writing control signal or to write the first voltage and the second voltage to the first node and the second node, respectively, according to the writing control signal and the timing control signal of the adjacent pixel row, the writing circuit comprises a tenth transistor having a first electrode electrically coupled to the data line, and a control electrode electrically coupled to the writing control line;

the storage capacitor circuit comprises a third capacitor and a temporary storage circuit, wherein a terminal of the third capacitor is electrically coupled to the first node, another terminal of the third capacitor is electrically coupled to the second node, a first terminal of the temporary storage circuit is electrically coupled to the second node, a second terminal of the temporary storage circuit is electrically coupled to a second electrode of the tenth transistor, and a control terminal of the temporary storage circuit is electrically coupled to a light-emitting control line for supplying the light-emitting control signal.

12. The pixel circuit according to claim 11, wherein the temporary storage circuit comprises a fourth capacitor and an eleventh transistor, wherein a first electrode of the eleventh transistor is electrically coupled to the second node, a second electrode of the eleventh transistor is electrically coupled to the second electrode of the tenth transistor, and a control electrode of the eleventh transistor is electrically coupled to the light-emitting control line; a terminal of the fourth capacitor is electrically coupled to the second electrode of the tenth transistor, and another terminal of the fourth capacitor is electrically coupled to a third power supply line, wherein the third power supply line is configured to provide a third voltage to the temporary storage circuit.

13. The pixel circuit according to claim 11, wherein the temporary storage circuit comprises a fifth capacitor and a twelfth transistor, wherein a terminal of the fifth capacitor is electrically coupled to the second node, and another terminal of the fifth capacitor is electrically coupled to the second electrode of the tenth transistor; a first electrode of the twelfth transistor is electrically coupled to the another terminal of the fifth capacitor, a second electrode of the twelfth transistor is electrically coupled to a third power supply line, and a control electrode of the twelfth transistor is electrically coupled to the light-emitting control line, wherein the third power supply line is configured to provide a third voltage to the temporary storage circuit.

14. The pixel circuit according to claim 1, wherein the reset circuit is configured to receive the writing control signal provided through a writing control line, and the reset circuit is configured to write a first voltage and a second voltage to the first node and the second node, respectively, according to the writing control signal, the writing circuit is configured to receive the data voltage supplied through a data line, wherein, the writing circuit comprises a thirteenth transistor having a first electrode electrically coupled to the data line, a second electrode electrically coupled to the second node, and a control electrode electrically coupled to the writing control line;

the reset circuit shares the thirteenth transistor with the writing circuit, the reset circuit further comprises a fourteenth transistor, a first electrode of the fourteenth transistor is electrically coupled to the first node, a second electrode of the fourteenth transistor is electrically coupled to a first power supply line, a control electrode of the fourteenth transistor is electrically coupled to the writing control line, wherein the first power supply line is configured to supply the first voltage to the reset circuit;

the storage capacitor circuit comprises a sixth capacitor and a temporary storage circuit, wherein a terminal of the sixth capacitor is electrically coupled to the first node, and another terminal of the sixth capacitor is electrically coupled to the second node; the temporary storage circuit comprises a seventh capacitor, a fifteenth transistor and a sixteenth transistor, wherein a first electrode of the fifteenth transistor is electrically coupled to the second node, a second electrode of the fifteenth transistor is electrically coupled to a terminal of the seventh capacitor, and a control electrode of the fifteenth transistor is electrically coupled to the writing control line; a first electrode of the sixteenth transistor is electrically coupled to the second node, a second electrode of the sixteenth transistor is electrically coupled to the terminal of the seventh capacitor, and a control electrode of the sixteenth transistor is electrically coupled to a light-emitting control line which supplies the light-emitting control signal; another terminal of the seventh capacitor is electrically coupled to a third power supply line, wherein the third power supply line is configured to supply a third voltage to the temporary storage circuit.

15. The pixel circuit according to claim 2, wherein the reset circuit is further configured to reset an anode of the light-emitting element according to the writing control signal or the timing control signal of the adjacent pixel row, wherein the timing control signal of the adjacent pixel row is the compensation control signal of a previous pixel row, and the reset circuit further comprises:

a seventeenth transistor having a first electrode electrically coupled to the anode of the light-emitting element, a second electrode electrically coupled to the first power supply line, and a control electrode electrically coupled to a writing control line or a compensation control line of the previous pixel row.

16. The pixel circuit according to claim 1, wherein the reset circuit is further configured to receive a compensation control signal and reset the first node and the second node according to the compensation control signal and the timing control signal of the adjacent pixel row, wherein the reset circuit is configured to receive the compensation control signal provided through the compensation control line, the timing control signal of the adjacent pixel row comprises a light-emitting control signal of a previous pixel row and a compensation control signal of a next pixel row, and the reset circuit comprises:

an eighteenth transistor having a first electrode coupled to the second node, a second electrode electrically coupled to a second power supply line, and a control electrode electrically coupled to a compensation control line of a current pixel row, wherein the second power supply line is configured to supply a second voltage to the reset circuit;

a nineteenth transistor having a first electrode electrically coupled to the light-emitting control circuit, a second electrode electrically coupled to a first power supply line, a control electrode electrically coupled to the compensation control line of the current pixel row, wherein the first power supply line is configured to supply a first voltage to the reset circuit;

a blocking circuit electrically coupled between the threshold compensation circuit and the driving transistor or between the driving transistor and a power supply, and further coupled to the light-emitting control line of the previous pixel row and the compensation control line of the next pixel row, and is configured to be turned on or turned off according to the light-emitting control signal of the previous pixel row and the compensation control signal of the next pixel row;

wherein, during the reset circuit resetting the first node and the second node, the second voltage is written into the second node through the eighteenth transistor, the blocking circuit is turned on under control of the light-emitting control signal of the previous pixel row and the compensation control signal of the next pixel row, the light-emitting control circuit is turned on under control of the light-emitting control signal, the threshold compensation circuit is turned on under control of the compensation control signal, and the first voltage is written into the first node through the nineteenth transistor, the light-emitting control circuit, and the threshold compensation circuit.

17. The pixel circuit according to claim 16, wherein the blocking circuit comprises a twentieth transistor and a twenty-first transistor, wherein first electrodes of the twentieth transistor and the twenty-first transistor are each electrically coupled to a second electrode of the driving transistor and second electrodes of the twentieth transistor and the twenty-first transistor are each electrically coupled to the threshold compensation circuit, or the first electrodes of the twentieth transistor and the twenty-first transistor are each electrically coupled to a power supply, and the second electrodes of the twentieth transistor and the twenty-first transistor are each electrically coupled to a first electrode of the driving transistor, and wherein a control electrode of the twentieth transistor is coupled to the light-emitting control line of the previous pixel row, and a control electrode of the twenty-first transistor is coupled to the compensation control line of the next pixel row.

18. A display panel, comprising the pixel circuit according to claim 1.

19. A method for driving the pixel circuit according to claim 1, comprising:

receiving the writing control signal, and writing the data voltage into the storage capacitor circuit according to the writing control signal;

receiving the reset control signal and resetting the first node and the second node according to the reset control signal, or receiving the writing control signal and/or the timing sequence control signal of the adjacent pixel row and resetting the first node and the second node according to the writing control signal and/or the timing sequence control signal of the adjacent pixel row;

receiving the compensation control signal, and writing the compensation voltage into the first node according to the compensation control signal, wherein the compensation voltage comprises at least the threshold voltage of the driving transistor; and receiving the light-emitting control signal, and controlling the light-emitting element to emit light according to the light-emitting control signal, wherein the driving transistor controls the light-emitting element to emit light according to the voltage of the first node, and the voltage of the first node in the driving stage is the voltage generated by adding the data voltage and the compensation voltage.

20. A pixel circuit, comprising:

a storage capacitor circuit, a first terminal of the storage capacitor circuit being electrically coupled to a first node, a second terminal of the storage capacitor circuit being electrically coupled to a second node;

a light-emitting element;

a driving transistor having a control electrode electrically coupled to the first node;

a writing circuit electrically coupled to the storage capacitor circuit and configured to receive a writing control signal and write a data voltage into the storage capacitor circuit according to the writing control signal;

a reset circuit electrically coupled to the first node and the second node, the reset circuit being configured to receive a reset control signal and reset the first node and the second node according to the reset control signal;

a threshold compensation circuit electrically coupled to the first node and the driving transistor, the threshold compensation circuit being configured to receive a compensation control signal and write a compensation voltage into the first node according to the compensation control signal, wherein the compensation voltage includes at least a threshold voltage of the driving transistor; and a light-emitting control circuit electrically coupled to the driving transistor and the light-emitting element and being configured to receive a light-emitting control signal and control the light-emitting element to emit light according to the light-emitting control signal, wherein the driving transistor controls the light-emitting element to emit light according to a voltage of the first node, and the voltage of the first node in a driving stage is a voltage generated by adding the data voltage and the compensation voltage, wherein the reset circuit is configured to receive the reset control signal supplied through a reset control line, and the reset circuit comprises:

a first transistor having a first electrode electrically coupled to the first node, a second electrode electrically coupled to a first power supply line, and a control electrode electrically coupled to the reset control line, wherein the first power supply line is configured to supply a first voltage to the reset circuit;

a second transistor having a first electrode electrically coupled to the second node, a second electrode electrically coupled to a second power supply line, and a control electrode electrically coupled to the reset control line, wherein the second power supply line is configured to supply a second voltage to the reset circuit, and wherein the reset circuit further comprises a potential holding circuit electrically coupled to the second node, the reset circuit is configured to receive the compensation control signal and write the second voltage to the second node according to the compensation control signal, wherein the compensation control signal is supplied to the potential holding circuit through a compensation control line, and the potential holding circuit comprises:

a third transistor having a first electrode electrically coupled to the second node, a second electrode electrically coupled to the second power supply line, and a control electrode electrically coupled to the compensation control line.

* * * * *